US008244631B2

(12) United States Patent
Ueno et al.

(10) Patent No.: US 8,244,631 B2
(45) Date of Patent: Aug. 14, 2012

(54) DATA TRANSFER SYSTEM USING MOBILE TERMINAL AND TWO-DIMENSIONAL BARCODE

(75) Inventors: Toshihiko Ueno, Saitama (JP); Yoshihiro Hoshino, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 2672 days.

(21) Appl. No.: 09/819,459

(22) Filed: Mar. 28, 2001

(65) Prior Publication Data
US 2001/0051915 A1   Dec. 13, 2001

(30) Foreign Application Priority Data

Dec. 18, 2000   (JP) ................................. 2000-384420

(51) Int. Cl.
*G06Q 40/00* (2006.01)
(52) U.S. Cl. ................ 705/39; 705/35; 705/36; 705/40; 705/41
(58) Field of Classification Search .................... 705/16, 705/17, 26, 27, 39–41, 35, 36; 455/406, 455/419; 235/462, 487
See application file for complete search history.

(56) References Cited

U.S. PATENT DOCUMENTS

| | | | |
|---|---|---|---|
| 5,450,491 A | | 9/1995 | McNair |
| 5,590,038 A | * | 12/1996 | Pitroda ........................... 705/41 |
| 5,789,732 A | * | 8/1998 | McMahon et al. ............ 235/487 |
| 5,883,810 A | | 3/1999 | Franklin et al. |
| 5,884,271 A | * | 3/1999 | Pitroda ............................. 705/1 |
| 6,000,832 A | | 12/1999 | Franklin et al. |
| 6,195,542 B1 | * | 2/2001 | Griffith ......................... 455/406 |
| 6,535,726 B1 | * | 3/2003 | Johnson ........................ 455/406 |
| 6,577,861 B2 | * | 6/2003 | Ogasawara ................... 455/419 |
| 6,736,322 B2 | * | 5/2004 | Gobburu et al. ......... 235/462.46 |
| 6,877,661 B2 | * | 4/2005 | Webb et al. .............. 235/462.01 |
| 7,003,495 B1 | * | 2/2006 | Burger et al. .................... 705/50 |
| 2002/0023027 A1 | * | 2/2002 | Simonds ......................... 705/26 |
| 2002/0091569 A1 | * | 7/2002 | Kitaura et al. .................. 705/14 |
| 2003/0047613 A1 | * | 3/2003 | Funamoto et al. ....... 235/462.01 |

FOREIGN PATENT DOCUMENTS

| | | |
|---|---|---|
| GB | 2345175 | 6/2000 |
| GB | 2352861 | 2/2001 |
| JP | 6295307 | 10/1994 |
| JP | 7182426 | 7/1995 |
| JP | 10320458 | 12/1998 |
| JP | 11501424 | 2/1999 |
| JP | 11-232348 | 8/1999 |
| JP | 11250353 | 9/1999 |
| JP | 11345272 | 12/1999 |
| JP | 2000057210 | 2/2000 |
| JP | 2000222514 | 8/2000 |

(Continued)

OTHER PUBLICATIONS

Webb et al., the U.S. Appl. No. 60/225,805, Aug. 16, 2000.*

(Continued)

*Primary Examiner* — Nga B. Nguyen
(74) *Attorney, Agent, or Firm* — Hoffman Warnick LLC; Andrea Bauer

(57) ABSTRACT

A data transfer system using a mobile terminal and a two-dimensional barcode, and more particularly, a processing system, server, processing terminal, and communications terminal that can be used to pay for purchases and manage membership cards and admission tickets, and other services.

26 Claims, 19 Drawing Sheets

FOREIGN PATENT DOCUMENTS

| | | |
|---|---|---|
| JP | 2000-306005 | 11/2000 |
| JP | 2000322486 | 11/2000 |
| JP | 2001-005883 | 1/2001 |
| JP | 2001-109835 | 4/2001 |
| JP | 2001-202429 | 7/2001 |
| JP | 2002-024730 | 1/2002 |
| JP | 2002-117313 | 4/2002 |
| WO | 98/30985 | 7/1998 |
| WO | WO 98/34203 | 8/1998 |
| WO | 9908238 | 2/1999 |
| WO | WO 00/03328 | 1/2000 |
| WO | WO 00/45349 | 8/2000 |
| WO | WO 00/57596 | 9/2000 |
| WO | 01/31594 | 5/2001 |
| WO | WO 01/88792 A1 | 11/2001 |
| WO | WO 02/08981 | 1/2002 |

OTHER PUBLICATIONS

Yasufuku, Mari, "Information Materials for IDS", dated Aug. 3, 2009.

Yasukawa, "IBM Information Materials for IDS", Jan. 14, 2009, 1 page.

Yasukawa, Keiko, "Information Materials for IDS", Sep. 24, 2008, Japanese Patent Office.

* cited by examiner

DATA TRANSFER SYSTEM USING MOBILE TERMINAL AND TWO-DIMENSIONAL BARCODE

BACKGROUND OF THE INVENTION

1. Field of the Invention

The present invention relates to data transfer system using a mobile terminal and a two-dimensional barcode, and more particularly, a processing system, server, processing terminal, and communications terminal that can be used to pay for purchases and manage membership cards and admission tickets, and other services.

2. Related Art

As commonly known, systems for using a credit card to pay for goods or services have come into widespread use. Such credit card payment systems are useful because a card holder does not need to carry cash. Because credit cards are also issued by a variety of entities such as stores and enterprise groups, a customer can hold a number of credit cards.

In addition, stores, shopping malls, or enterprise groups may issue a credit card with a membership card function or a membership card (customer card) without a payment function. These cards may provide "points" to their customers according to the amount paid or the utilization of the card. Alternativley, these cards may provide a discount or provide free services, added benefits, goods, or service information according to accumulated points in order to earn the loyalty of the customers.

As the result of the widespread use of the credit cards and membership cards, customers carry many credit cards and membership cards. Accordingly, the management of these cards becomes complicated. In addition, if a customer loses a credit card, the customer has to take extensive measures. Furthermore, other problems arise such as the fraudulent use of a credit card by another person due to the theft of the card itself or its number. Because the customer has several kinds of membership cards, it is very troublesome for both the customer and the issuer of the card to keep track of and manage services and the number of "points" provided by the use of each card. In addition, an increased number of credit and membership cards make customer's wallet, or card holder, bulky and makes many customers feel awkward.

In recent years, online shopping through a communication medium such as the Internet has become widespread. When a user uses a credit card to pay for purchases, the user sends authentication information such as the credit card number, personal identification code of a particular credit card used and a password through the communication medium such as the Internet. It is difficult to prevent the theft or fraudulent use by another person of this information.

On the other hand, a customer visiting an event such as a concert or a sporting event purchases a ticket and shows it to a ticket taker at the gate of the event site before entering the site. Today, tickets can be purchased through the Internet. In this case, the customer may obtain a confirmation number of the ticket through the Internet, then go to a ticket window to receive the paper ticket in exchange for the confirmation number. This activity prevents forgery of the ticket. In such a system, however, the customer cannot fully enjoy the paperless benefits of online shopping because of the need to visit the ticket window.

In view of the foregoing there is a need in the art for a processing system, server, processing terminal, and communications terminal that are highly convenient for customers.

SUMMARY OF THE INVENTION

A first aspect of the invention includes a processing system including a process execution terminal that accepts information for identifying a customer, and provides the information to a data management server. The data management server that received the information identifies the customer based on the information, generates reply information about the customer based on the entered information, and provides the reply information to the process execution terminal. Then, the process execution terminal, which received the reply information, executes a process for the customer based on the reply information.

When the customer pays for goods or a service from a process executer (e.g., a store), the customer provides the store information for identifying the customer such as an identification code consisting of a string of digits or characters pre-assigned to the customer, or his/her name. The identification information may be the number of a credit card or membership card held by the customer if adequate security is provided. Because a data manager rather than the process executer identifies the customer, the anonymity of the customer to the process executer is preserved by assigning an identification code that has no connection with the name, address, or other personal information about the customer or the number of the customer's credit card or bank account.

The process executer (e.g., store), who receives the above-mentioned information identifying the customer, provides the information to the data management server. The data management server identifies the customer based on the information and obtains registration information about the customer. The registration information may be, for example, the number of customer's credit card, debit card, or bank account for payment. If the registration information is the number of a payment card such as the customer's credit card or debit card, the data management server can inquire of an external credit institution such as a credit card company or bank about the number of the card for payment and gain the approval for the payment. Then, the data management server may provide the approval information as reply information to the process executer.

When the process executer receives the reply information, the process executer receives the payment for the customer's purchase based on the approval information obtained from the external financial institution through the data manager. In such a case, the process for the customer executed by the process execution terminal is a payment process and sale process based on the approval information on the customer's credit card.

In this way, the processing system according to the present invention allows the customer to pay for purchases without carrying a credit card. The reply information generated by the data management server based on the registration information may be minimal. For example, the information required may only include credit card payment approval information rather than the registration itself. This can prevent personal information such as a credit card number from being known to the process executer.

The processing system according to the present invention can be applied to, for example, a case in which a customer pays for goods or a service ordered through an online shopping or mail order system, or utility bills at a convenience store, i.e., where a store carries out collection of money for the provider of the goods or service. In such a case, when the data management server receives information for identifying the customer from the store, the data management server identifies the customer based on the information and obtains registration information about the customer. The registration information may be customer billing information (e.g., amount billed, billing date, details of billing, etc.) provided to the data management server from the online shopping, mail-order, or utility company. The data management server notifies the process executor of at least the billed amount in the billing information as reply information based on the registration information.

The process executer, who receives the reply information, receives payment from the customer. In such a case, the process executer may receive the payment by cash as well as the credit card, as described above. The process executed by the process execution terminal for the customer in this case is billing the customer based on the reply information.

The processing system according to the present invention can also be applied to a system for handling tickets for admission to an event site. In such a case, a customer orders a ticket from a ticket agency before entrance and the ticket agency provides ticket information on the customer to a data management server and the data management server stores the ticket information as registration information. The ticket information includes, for example, the issue number of the ticket, the name of the event site, the title of the event, date and time, seating, and other data required for the entrance into the event site.

When the customer enters the event site, the customer provides information for identifying the customer described earlier (to the process executer) at the entrance gate. A terminal at the entrance gate provides the information to the data management server. The data management server identifies the customer based on the information and obtains the above-mentioned ticket information as registration information on the customer. The data management server then determines, based on the registration information, whether the customer ticket information, i.e., the ticket, is valid or not and provides the result of the determination to the entrance gate as reply information. Alternatively, the ticket information may be provided directly to the entrance gate as reply information and the validity of the ticket may be determined in the terminal at the entrance gate. In this case, the process executed for the customer on the terminal at the entrance gate is a process for outputting the validity of the customer's ticket, i.e., the result of the determination as to whether entrance is allowed or not, or a determination process concerning the validity of the ticket before the output.

The processing system according to the present invention can also be applied to the management of "points" of a membership card. In this case, the registration information stored in a data management system may include the personal information such as the name of a customer, points held by the customer, expiration date of the points, and other information. The process executed for the customer on a process execution terminal is the addition or subtraction of points and a process for discounting by applying points to a purchase.

Another aspect of the invention may include providing credit and membership card functions on a mobile phone or Personal Digital Assistants (PDA). This provision reduces the bulky nature of carrying multiple cards. However, if a credit card number and other information are stored in the mobile phone or PDA, extensive countermeasures would be required in the event that the mobile phone or PDA is lost and there would be the possibility that the credit card number might be maliciously used. Therefore, if the processing system according to the present invention further comprises a communications terminal such as a mobile phone or PDA, the data management server is configured so as to send information for identifying a customer to the ccustomer's communications terminal when the data management server is accessed from the customer's communications terminal. That is, information such as a credit card number is not stored in the customer's communications terminal. Instead, the customer accesses the data management server to receive the information when the customer uses the credit card function. Alternatively, the telephone number of the customer's communication terminal may be set as information for identifying a customer.

When the customer's communication terminal receives the information, it may output the information to a process execution terminal. In particular, the information is sent to the process execution terminal by wireless communication such as that referred to as Bluetooth.

In the processing system according to the present invention, the data management server may associate an identification code identifying a customer with registration information and store them, and may send a mark representing the identification code to the customer's communications terminal. The mark representing the identification code may be a bar code, but other types of marks may be used.

Currently a liquid-crystal panel is used as the display screen for displaying an image on the a mobile phone or PDA which would be used as the customer's communications terminal. If a conventional "one-dimensional barcode" consisting of a combination of thin and thick lines and black and white lines is displayed on this type of screen, the barcode cannot practically be read by a barcode reader because of the resolution of the liquid-crystal display and the insufficient ability of the barcode reader to read such barcodes. In accordance with the invention, a two-dimensional barcode is displayed on the display screen, which can be read by the barcode reader. It is preferable in terms of security that data about such a mark is invalidated after the completion of processing on the process execution terminal.

In another aspect of the invention, a server is provided that issues an identification code to the customer's communication terminal. The identification code may be issued as barcode data. The security of the system can be improved by issuing the identification code only if it can be verified that a valid password is input from the customer's terminal.

Instruction information may be generated for instructing a process executer about an action to be performed for the customer. The instruction information may be provided to the process execution terminal when the process executer receives the identification code from the process execution terminal. In particular, the information may include determination as to whether payment with a credit card is allowed, or the result of the validation of a ticket (determination about admission) in an admission process.

In addition, whether a process requested by the process execution terminal should be performed may be confirmed with the customer's communication terminal in order to improve the security.

Another aspect of the present invention may include a communications terminal comprising a display for displaying an image, a communicator capable of accessing an external server, a code issue requester for requesting an external server to issue a process code, and a display controller for causing the display to display the process code in two-dimensional barcode form based on data for displaying the issued process code in two-dimensional barcode. The image display may be, for example, a liquid-crystal panel. A QR code or data code displayed on the liquid-crystal panel in the form of the two-dimensional barcode can be read adequately with a barcode reader.

The two-dimensional barcode may be associated with customer billing information. That is, the billing information such as the amount claimed from the customer may be associated with the two-dimensional barcode and stored in an external database, instead of including the billing information in the two-dimensional barcode itself. The two-dimensional barcode displayed on the display of the communications terminal can function as an admission ticket by containing data, such as a ticket issue number, event site name, event title, date and time, seat position, and other data required for entering the event site.

Another aspect of the invention includes: a processing system for credit card payment using a portable terminal, wherein card information about a card such as a credit card or membership card held by a customer is pre-registered in a wallet center (data management server) along with personal authentication information, portable terminal identification information, and card select information for selecting a particular card; the wallet center is accessed from the portable terminal or a payment terminal located at a store and the card select information on the card to be used is sent to the wallet center; one card is identified based on the sent card select information; and information about payment by the identified card or customer added-value information such as courtesy and discount services provided for each card according to the purchase of goods or a service, is sent to the portable terminal.

Another aspect of the present invention may include an information processing system for credit card payment, wherein card information about a credit card held by the customer is pre-registered in the wallet center along with the personal authentication information, the portable terminal identification information, and the card select information for selecting a particular card. The card select information on the customer and the card to be used when purchasing goods is sent to the wallet center through a store terminal located at a store along with payment information. The card is identified based on the sent card select information sent. The information on the card to be used and payment information is sent to the portable terminal of the customer. The authentication information is returned to the wallet center after the confirmation of the sent payment information. The returned authentication information is checked, then a reimbursement process is performed and the store terminal is notified of the reimbursement process.

The processing system may be a system for credit card payment, wherein the card information about a credit card held by the customer is pre-registered in the wallet center along with personal authentication information, portable terminal identification information, and card select information for selecting a particular card. A store terminal such as a payment terminal located at a store is accessed from a portable terminal and the card select information about a card to be used is input along with customer information. The card select information and payment information is sent from the store terminal to the wallet center. The card is identified based on the sent card select information and card identification information is checked and then the payment information is sent to the portable terminal of the customer. The sent payment information is confirmed by the customer and then the authentication information is returned by the customer. The authentication information for confirmation returned by the customer is checked and then a reimbursement process is performed. The store terminal at the affiliated store is notified of the completion of the payment, and the payment information is sent to the card issuer.

The system may also be a processing system for credit card payment, wherein card information about the membership card held by a customer is pre-registered in the wallet center along with personal authentication information, portable terminal identification information, and card select information for selecting a particular card. Customer added-value information such as courtesy and discount services provided for each card according to the purchase of goods or a service is stored in the wallet center from point to point. The wallet center is accessed through a portable terminal and card select information for identifying a card is sent to the wallet center. Customer added-value information stored in the card identified by the sent card select information is returned to the portable terminal. Alternatively, the customer added value information may be returned to a store terminal.

In addition, the system may be a processing system for credit card payment, wherein card information about a card such as a credit card or customer credit card held by a customer is pre-registered in the wallet center along with personal authentication information, portable terminal identification information, and card select information for selecting a particular card. Customer added-value information such as courtesy and discount services provided for each card according to the purchase of goods or a service is stored in the wallet center from point to point. The wallet center is accessed through a portable terminal or a store terminal such as a payment terminal located at a store and card select information on one card to be used is sent to the wallet center. One card is identified based on the sent card select information. Payment by the identified card is made by combining it with the stored customer added-value information, and the payment information is sent to the portable terminal.

The card information may be a card name, card issuer name, card number, personal identification number, and expiration data. The card select information is digits or symbols for selecting a particular card from a plurality of cards held by a particular customer and is information which can be sent from a portable terminal.

The personal authentication information is digits or symbols for authenticating a person who holds a card and includes a personal identification number and password which can be sent form a portable terminal. The personal terminal is typically a mobile phone. However, it may be a personal digital assistant having communication capability or any other personal portable terminal that allows a user to communicate information to and from the wallet center. The portable terminal identification information is a mobile phone number, PDA number, or symbol for identifying a personal terminal such as a mobile phone or PDA.

The membership card may be a card issued by an individual affiliated store or a group of affiliated stores independently. The membership card, in general, has no payment capability, and provides customer added-value information such as information about a courtesy or discount service. The courtesy or disount service may be calculated based on goods or services purchased by the customer at each affiliated store. It may also provide sales information about the affiliated store. The customer added-value information may include information about a bargain sale or merchandize in addition to the courtesy or discount information. Adding such information to the customer added-value information allows meticulous information to be provided to each customer.

The wallet center is an independent facility for registering card information about a credit card or membership card held by a customer along with personal authentication information, portable terminal identification information, card select information for selecting a particular card, and customer added-value information. In addition, the wallet center may perform reimbursement or provide the customer added-value information. The wallet center may be, for example, a credit card issue company.

According to the above-described aspects of the present invention, a customer (cardholder) does not need to physically carry a card and can purchase goods or services at a store by using a desired credit card through a portable terminal such as a mobile phone. The identification of a particular card to be used from a plurality of cards held by the card holder and personal authentication are provided by sending and receiving card selection information and personal authentication information between the portable terminal and the wallet center. In addition, in the process of payment, the customer and the affiliated store does not need to know a credit card number and the fraudulent use of a credit card by another person due to the theft of the credit card can be prevented because it can be checked by making contact with the portable terminal from the wallet center and receiving personal authentication information. To use a membership card, customer added-value information stored in a card can be obtained by accessing the wallet center from the portable terminal and sending card select information to the wallet center to identify the card. The registration and management of a plurality of items of card information, card select information, personal authentication information and portable terminal information is performed by a computer. In particular, the wallet center automatically calls the portable terminal through the computer to perform the personal authentication. Human intervention can, therefore, be eliminated to prevent any fraudulent action.

While the mobile phone of the customer and the store terminal make contact with each other wirelessly in the foregoing descriptions, the card select information may be communicated by using the communication capability of the portable terminal or orally if the portable terminal does not have wireless communication capability. Of course, the contact between a store and the wallet center may be made through a wire telephone or private communication line, besides the portable telephone. If customer added-value information is not used, the card select information is sent to the store terminal through the portable terminal to perform payment processing. If only the customer added-value information is checked, the customer accesses the wallet center through his/her mobile phone to send card select information to receive and display the information on the mobile phone.

In this way, the customer does not need to physically carry cards and can use a portable terminal such as a mobile phone to purchase goods or services at a store by any credit card. In addition, in the process of payment, the customer and the affiliated store do not need to know a credit card number. Accordingly, the fraudulent use of a credit card by another person due to the theft of the credit card can be prevented because it can be checked by making contact with the portable terminal from the wallet center and receiving personal authentication information. To use a membership card, customer added-value information stored in a card can be obtained by accessing the wallet center from the portable terminal and sending card select information to the wallet center to identify the card.

As described above, the present invention provides a system that is highly convenient for customers.

DETAILED DESCRIPTION OF THE PREFERRED EMBODIMENTS

The present invention will be described below with respect to a first to seventh embodiments shown in the accompanying drawings.

First Embodiment: Payment-for-purchase Case One

Figure 1:
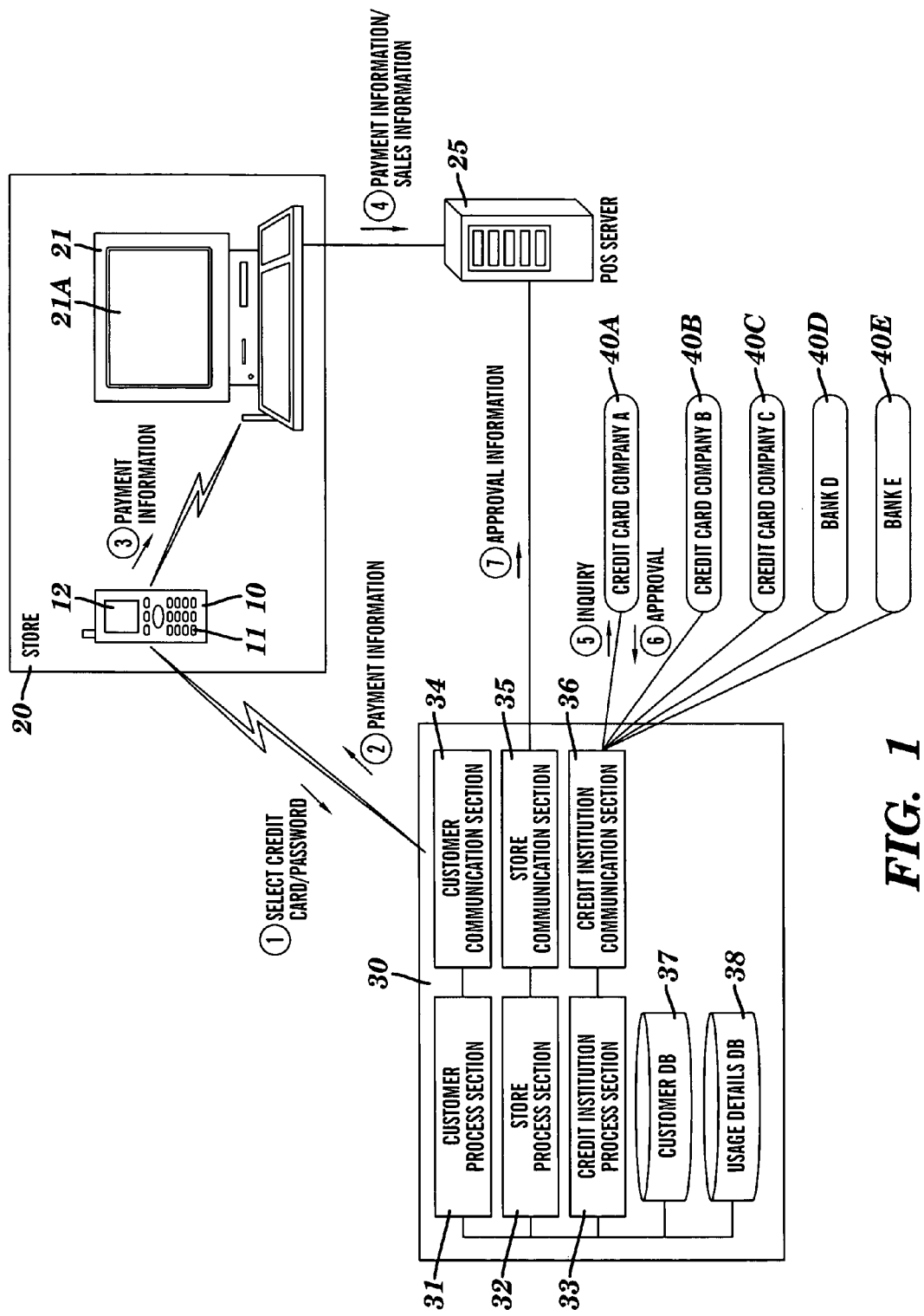
FIG. 1 shows a configuration of a processing system according to a first embodiment.

FIG. 1 is a diagram for illustrating a general configuration of a cardless payment system according to the first embodiment. As shown in FIG. 1, the cardless payment system (processing system) of the present embodiment causes an identification code issued by a server (data management server, external server) 30 at a management center, to be output to a portable communications terminal 10. The customer has a contract with the management center. The identification code is outputted when the customer visits a store 20 with the portable communications terminal (customer's communications terminal) 10 and pays for goods or a service that the customer wants to purchase. The store 20 accepts the identification code output on the portable communications terminal 10 by the customer, inquires of the server 30 at the management center about the identification code, and performs accounting for payment for the goods or services that the customer desires.

As shown in the figure, the portable communications terminal 10 owned by the customer comprises a communication section (within terminal 10) for communicating with the server 30 of the management center over a telephone network or a network such as the Internet, an input section 11 for the user to input information to be sent to the server 30 of the management center, and a display section (display means) 12 preferably including a liquid-crystal panel for displaying information sent from the server 30 of the management center. The portable communications terminal 10 of the present invention further comprises a wireless transmitter (not shown) such as Bluetooth for wirelessly outputting the identification code.

The store 20 has a cash register (process execution terminal, processing terminal) 21 for accounting. The cash register 21 comprises a wireless receiver for receiving an identification code sent wirelessly from the customer's portable communications terminal 10, an accounting section for accounting, a communication section for performing bi-directional communications over a telephone network or a private communication line with the server 30 of the management center, and a display 21A for displaying information.

If a Point of Sales (POS) system is installed in the store 20, the communication with the server 30 of the management center is performed through a POS server 25.

The server 30 of the management center comprises a customer process section (code issue section) 31 responsible for processing for customers, a store process section (instruction information issue section) 32 responsible for processing for stores, and a credit institution process section 33 responsible for processing for credit institutions (external credit institutions) such as a credit card company and a bank. The customer process section 31 communicates with customer's communications terminal 10 over a telephone network or a network such as the Internet through a customer communication section 34. The store process section 32 communicates with the communication section of the cash register at the store 20 through a store communication section (process executer communication section) 35. The credit institution process section 33 communicates with credit card companies (A, B, C) 40A, 40B, 40C and banks (D, E) 40D, 40E with which the server 30 of the management center has a contract over private lines through a credit institution communication section 36.

The server 30 of the management center has a customer DB (database, data storage) 37 for storing pre-registered customer information. The customer DB 37 contains registration information entered online or by mail by a customer beforehand, including the name and address, and personal information of the customer, telephone numbers of a portable communications terminal 10 held by the customer, the name of credit institution that the customer wants to use, the number of a card for payment such as a credit card or debit card (hereinafter simply called a "credit card") of the customer, a bank account number for direct debit and other payment information of the customer. The customer DB 37 also holds status information on the credit card registered by each customer. The status of the credit card registered by the customer is usually "not available" unless access is made by the customer. The status of a credit card selected by the customer and becomes "available" when access is made by the user using a valid password.

The server 30 of the management center further includes an account DB (usage details) 38. The account DB 38 contains details about the usage of the cardless payment system by each user, including use data and time, the name of store used, purchased item, amount used, the name of credit institution used, result of payment, etc.

Figure 2:
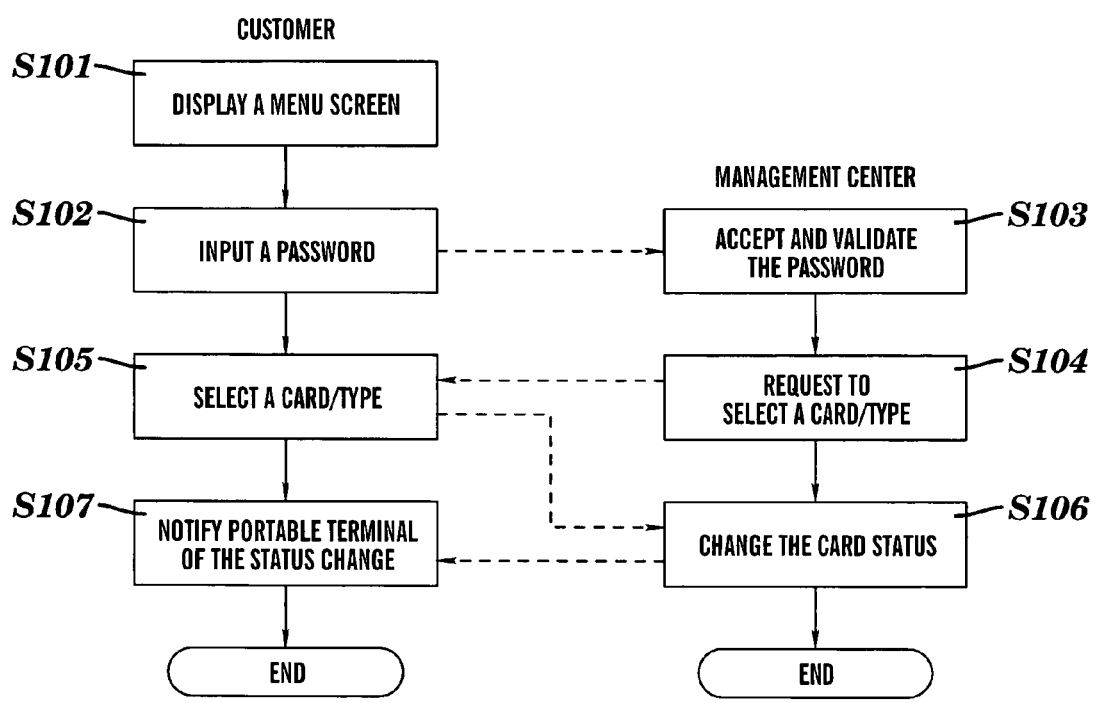
FIG. 2 shows a flow of a credit card status change process.

A flow of a process will be described below in which a customer pays for goods or services in the cardless payment system configured as described above. FIGS. 2 and 4 show flows of processes in which a payment for a purchase is processed. FIGS. 3A-D and 5A-B show examples of display screens displayed on the display 12 of customer's portable communications terminal 10 or on the display (process information output means) 21a of the cash register 21 at a store 20, at each stage of each process.

The customer accesses the customer communication section 34 of the server 30 of the management center beforehand to set the status of a credit card to be used. To do so, the user causes a menu screen for specifying a credit institute on the display 12 of the personal communications terminal 10 as shown in FIGS. 2 and 3A-D by performing a predetermined operation (step S101, FIG. 3A). Then, for the reason of security, the customer inputs a password in response to a prompt displayed on the menu screen through the input section 11 (step S102). The input password data is sent to the customer communication section 34 of the server 30 of the management center. At this point, the portable communications terminal 10 automatically sends the telephone number of itself based on a control program pre-installed in it.

The customer process section 31 receives the data, accepts the telephone number of the portable communications terminal 10 and the password sent, and makes reference to the customer DB 37 to see if both of them are valid or not (step S103).

Figure 3:
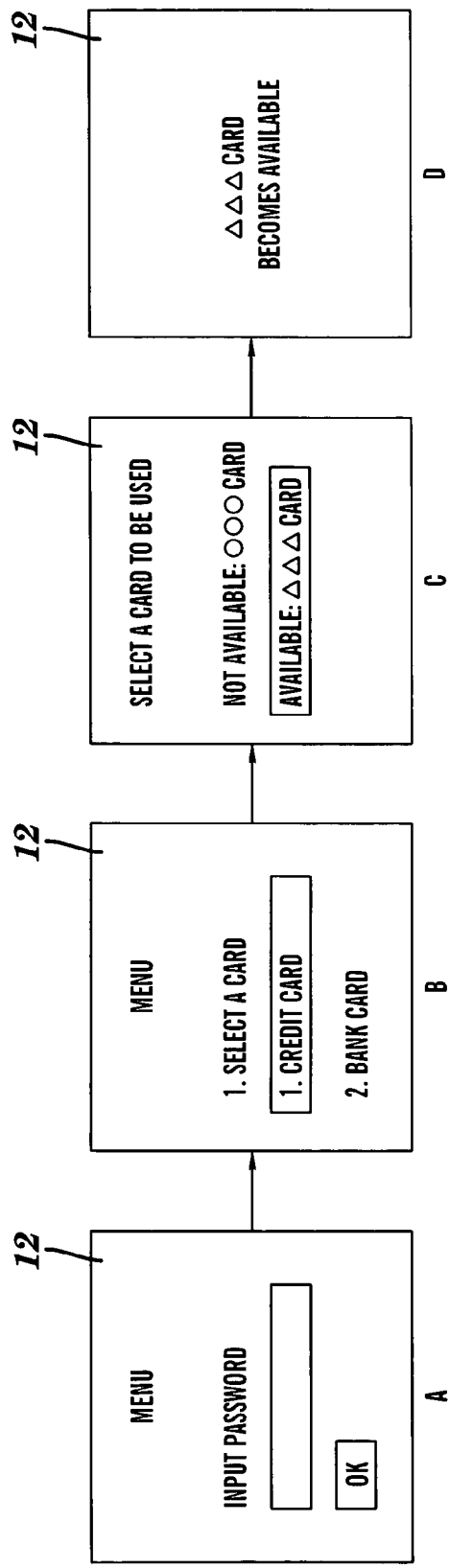
FIGS. 3A-3D show an example of a screen displayed on a portable communications terminal of a customer during the process shown in FIG. 2.
Figure 4:
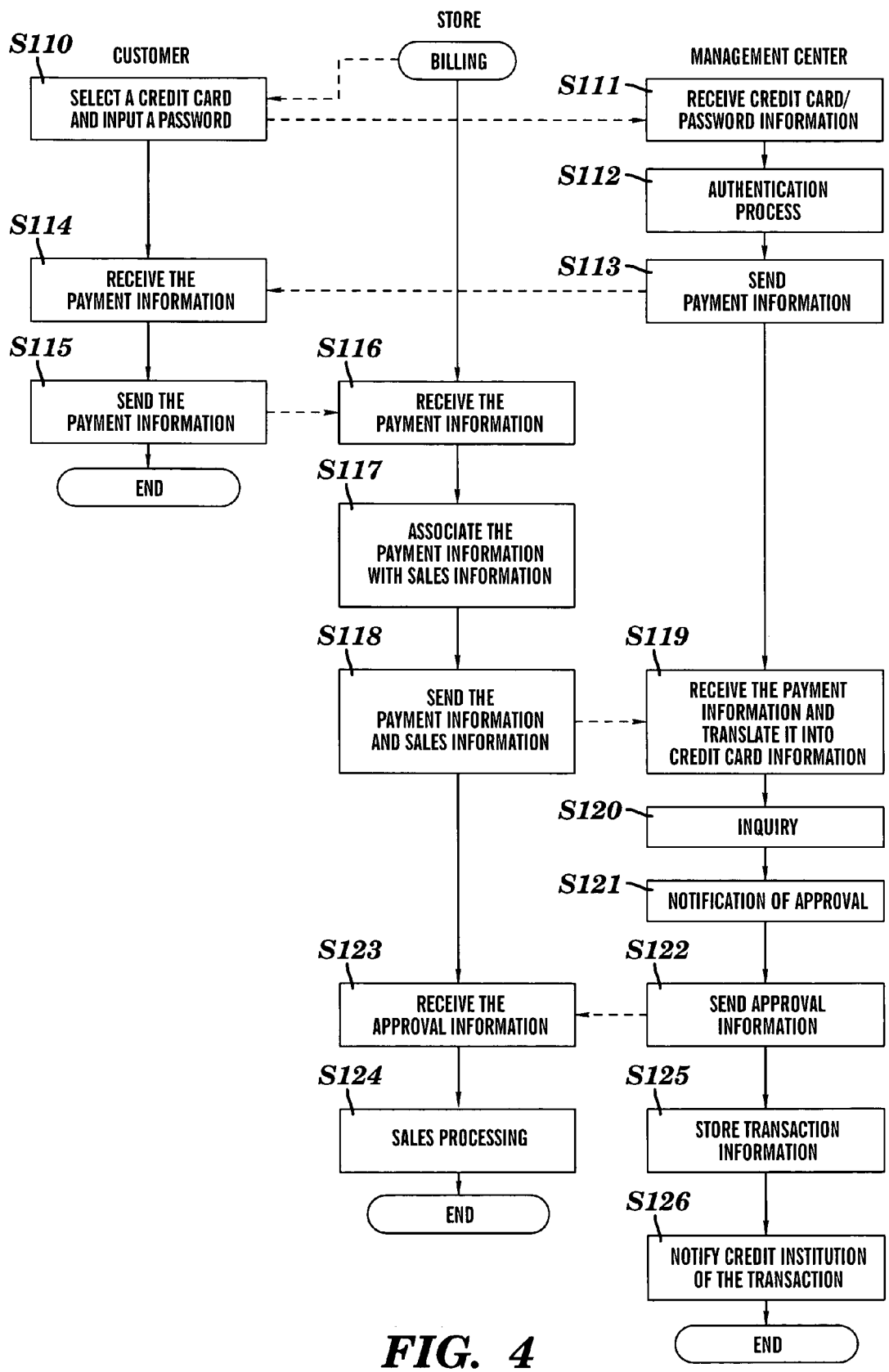
FIG. 4 shows a flow of a payment process.

After the completion of the check process at step S103, the customer process section 31 requests the customer's portable communications terminal 10 to select a type of card, e.g. credit card, bank card, etc., to be used (made available) through the customer communication section 34 (step S104, FIG. 3B). On the portable communications terminal 10, which receives the request, the customer selects the type of card to be used, e.g., a credit card (step S105, FIG. 3C). In addition, if more than one card of a particular type is used, the customer can select a particular card within a type of card. The data on the card type and credit card selected are sent to the server 30 of the management center. The customer process section 31 receives the data, changes the status of the credit card selected by the user to the "available" state (step S106) and notifies the portable communications terminal 10 of the status change (step S107, FIG. 3D).

The status of the credit card maintains the "available" state unless the user performs an operation for changing the status to the "not available" state. By setting the status in this way, the user can select an available credit card as if the user selected a credit card to put in the user's wallet, assuming the user has a number of credit cards.

The portable communications terminal 10 may store the types of credit card (credit card company name) registered by the user and the status of each credit card in internal memory, thereby allowing a list of credit cards held by the user and their status to be displayed on the display 12 without the need for accessing the server 30 of the management center.

After the credit card(s) to be "available" to the customer is indicated to the server 30 of the management center, if the customer pays an amount billed by the store 20 for the goods or services, the customer selects an available credit card used for payment and inputs a password (step S110) on the display screen of the portable communication terminal 10 as shown in FIG. 4. Then, the credit card type selected (and selected card if more than one card is present within a type) and the password is indicated by the portable communications terminal 10 to the customer process section 31 through the customer communication section 34 of the server 30 of the management center to request the issue of an identification code as code issue request means (step S111 in FIG. 4, (1) in FIG. 1).

The customer process section 31 of the server 30 at the management center makes reference to the customer DB 37 based on the telephone number of the portable communications terminal 10 automatically sent during this indication and the indicated password and performs a authentication process for the customer (step S112). After the completion of the authentication process, the customer process section 31 generates payment information, which is the identification code to be provided from the customer communications terminal 10 to the store 20. The payment information in the present embodiment is generated as character string data in a predetermined format by combining the telephone number of the portable communications terminal 10 and the credit card type selected by the customer. Then the payment information generated in the customer process section 31 is sent to the portable communications terminal 10 through the customer communication section 34 (step S113, (2) in FIG. 1).

When the portable communications terminal 10 receives the payment information through the communication section (step S114), the portable communications terminal 10 automatically and wirelessly outputs the payment information to the cash register 21 through a wireless transmitter (not shown) according to the control program (not shown) (step S115 in FIG. 4, (3) in FIG. 1). Instead of automatically outputting the received payment information, it may be output by a predetermined operation performed by the customer.

Figure 5:
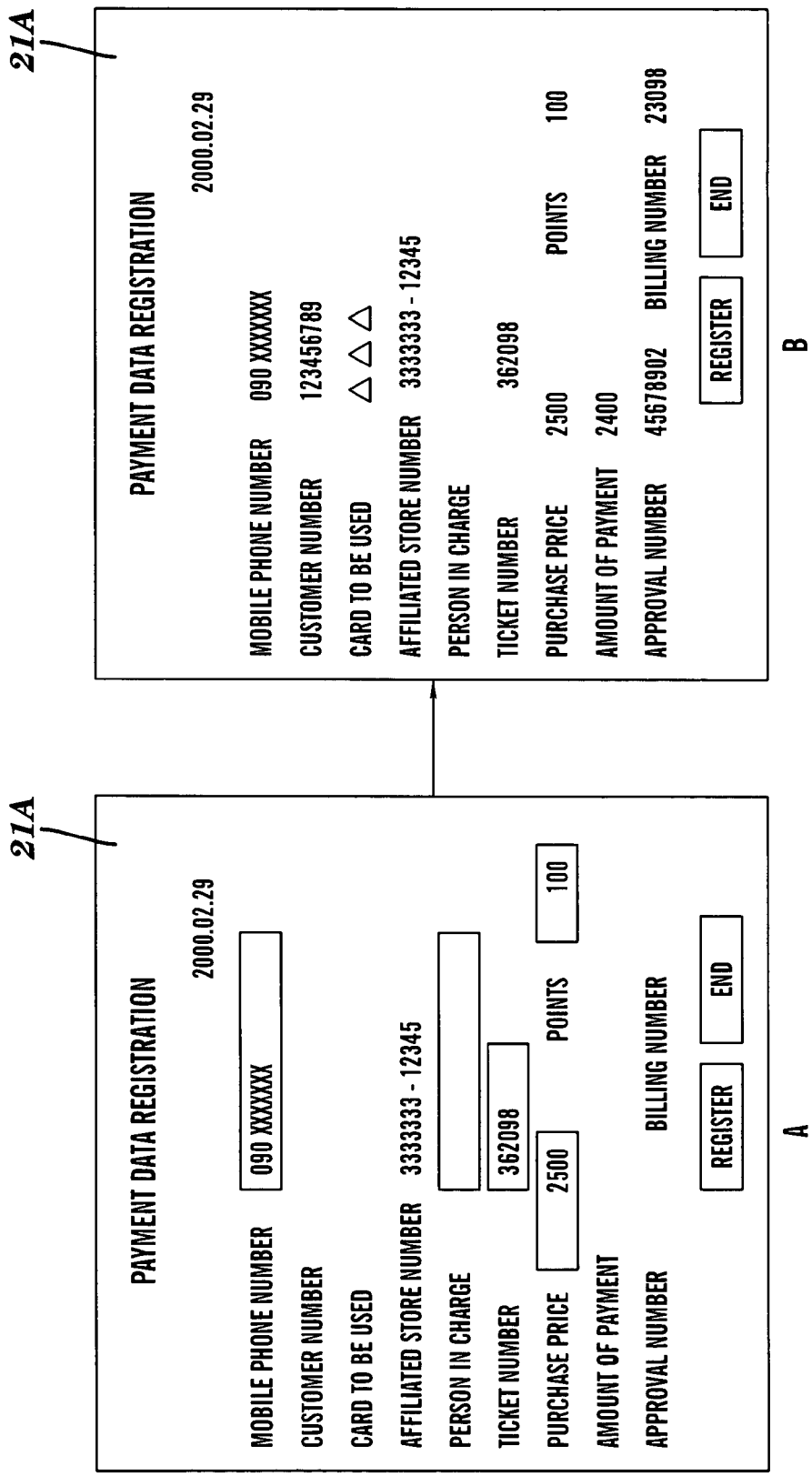
FIGS. 5A-5B show an example of a screen displayed on a cash register at a store.

The cash register 21 at the store 20 receives at its wireless receiver the payment information wirelessly output from the portable communications terminal 10 (step S116). Then, sales information and the payment information are displayed on the display 21a of the cash register 21 as shown in FIG. 5A. The cash register 21 associates the received customer's payment information with the sales information concerning the amount the customer is billed for the goods or services (step S117), then sends the payment information and sales information to the store process section 32 of the server 30 of the management center through the communication section and store communication section 35 (step S118 in FIG. 4, (4) in FIG. 1). The sales information may include, in addition to the amount claimed from the customer, additional information about the goods that the customer wants to purchase, such as the name, size, and price of the goods. The additional information may be provided to a POS server 25 positioned on its transfer route to the server 30 of the management center.

When the store process section 32 receives the customer's payment information and sales information from the store 20, it makes reference to the customer DB 37 based on the customer's payment information (the telephone number of the portable communications terminal 10 and the credit card type and card selected) to obtain credit card information such as the number, expiration data, and status of the credit card selected by the customer. Thus, the payment information is translated into the specific credit card information only after reaching the server 30 of the management center (step S119).

Then, the customer process section 32 transfers the obtained information such as the number and expiration data of the customer's credit card to the credit institution process section 33. The credit institution process section 33 receives the information and inquires, through the credit institution communication section 36, of a credit card company used by the customer about the payment (step S120 in FIG. 4, (5) in FIG. 1). As a result, the approval process is completed when the notification of the approval of the payment and the approval number are provided by the credit card company through the credit institution communication section 36 to the customer process section 32. The store process section 32 therefore sends the approval number as an instruction and reply information to the cash register 21 at the store 20 through the store communication section 35 (step S122 in FIG. 4, (7) in FIG. 1).

The cash register 21 at the store 20, which receives the information (step S123), displays the approval number on the display 21a as shown in FIG. 5B and becomes ready for sales processing. Thereafter, the sales processing for the customer is performed in the same way as the processing for conventional payment by credit card (step S124).

On the other hand, the server 30 of the management center stores transaction information such as the customer's credit card number, the affiliation number of the store 20, transaction date and time, amount, and approval number provided from the store 20 in the account DB 38 (step S125) and provides the transaction information to the credit institution (step S126).

In this way, the customer can pay for purchases without using the credit card number by outputting the payment information to the cash register 21 at the store 20 through the portable communications terminal 10 held by the customer. Thus, the customer does not need to carry the credit card itself, the loss or theft of the credit card on the road can be prevented, the system security can be improved, and a bulky wallet containing a number of credit cards can be avoided.

Because wireless communication such as Bluetooth is used to output the payment information from the portable communications terminal 10 to the cash register 21, neither the customer nor the store personnel needs to input the payment information, thus saving the labor of input operation and eliminating operation mistakes to increase the speed of the process.

In addition, because the payment information output from the portable communications terminal 10 to the cash register 21 is only the telephone number of the portable communication terminal 10, the credit card type (credit card company name), selected card used by the customer, and the credit card number cannot be directly revealed to the store 20, thus improving the security of the system.

Furthermore, the portable communication terminal 10 itself does not contain credit card numbers and like information. When the customer pays for purchases, the customer uses his/her password to access the server 30 of the management center from the portable communication terminal 10 and receives payment information issued. Therefore, if the portable communications terminal 10 is lost, the fraudulent use of the credit card numbers by another person can be prevented because the password is required for using them.

Thus, according to the above-described configuration, a highly secure system that can prevent fraudulent use of credit card numbers by another person is provided. In addition, a highly convenient cardless system that eliminates the need for a customer to carry a credit card itself can be provided.

Second Embodiment: Payment-for-purchase Case Two

Figure 6:
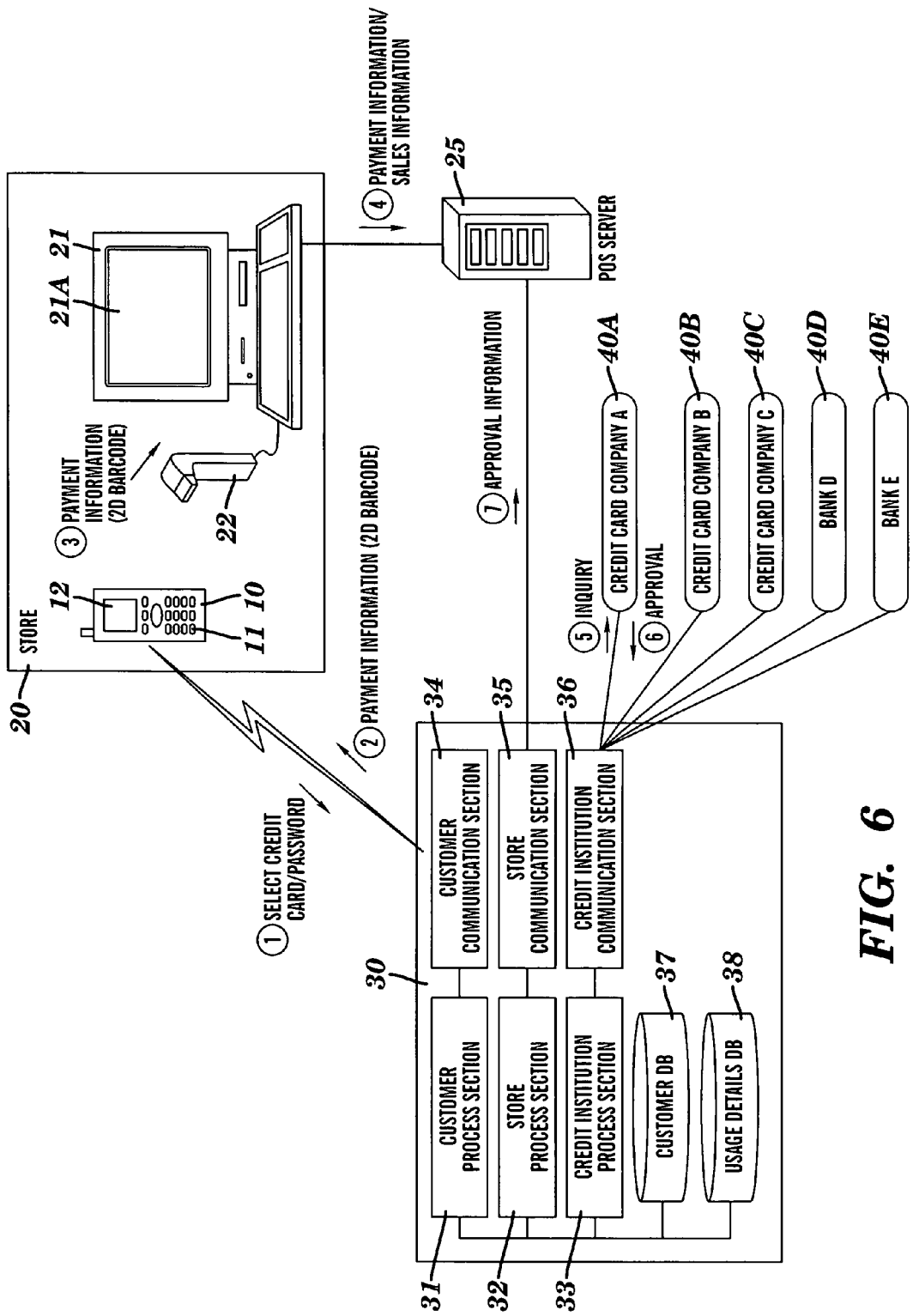
FIG. 6 shows a configuration of a processing system according to a second embodiment.

FIG. 6 is a diagram for illustrating a general configuration of a cardless payment system according to a second embodiment. As shown in FIG. 6, the cardless payment system of the present embodiment is the same as that of the above-described first embodiment in that, when a customer wants to pay for a purchase at a store, the customer causes his/her portable communications terminal 10 to output an identification code issued by a server 30 at a management center, then the store 20 receives, instead of a credit card number, the identification code output from the portable communications terminal 10 and uses the identification code to perform accounting for the payment. The present embodiment differs from the first embodiment in that the identification code output from the portable communications terminal 10 is a barcode, in particular, a two-dimensional barcode displayed on the display 12 of the portable communications terminal 10.

In the following description, only the configurations and processes that differ from the first embodiment will be described and the description of the same configurations and processes as the first embodiment will be omitted.

As shown in FIG. 6, the present embodiment differs from the first embodiment in that the customer causes a barcode (mark) to be displayed (output) on a display 12, which preferably comprises a liquid-crystal display provided in a portable communications terminal 10.

At a store 20, a cash register 21 has a barcode reader (mark reader, code receiving means) 22.

A server 30 at a management center uses the telephone number of the portable communications terminal 10 and the credit card type (and selected card if greater than one card within a type) selected by the customer, which is output by the customer to the store 20 as payment information to generate barcode data. Instead of the character string data in the above-mentioned first embodiment, the management center issues barcode data to the customer's portable communications terminal 10.

Figure 7:
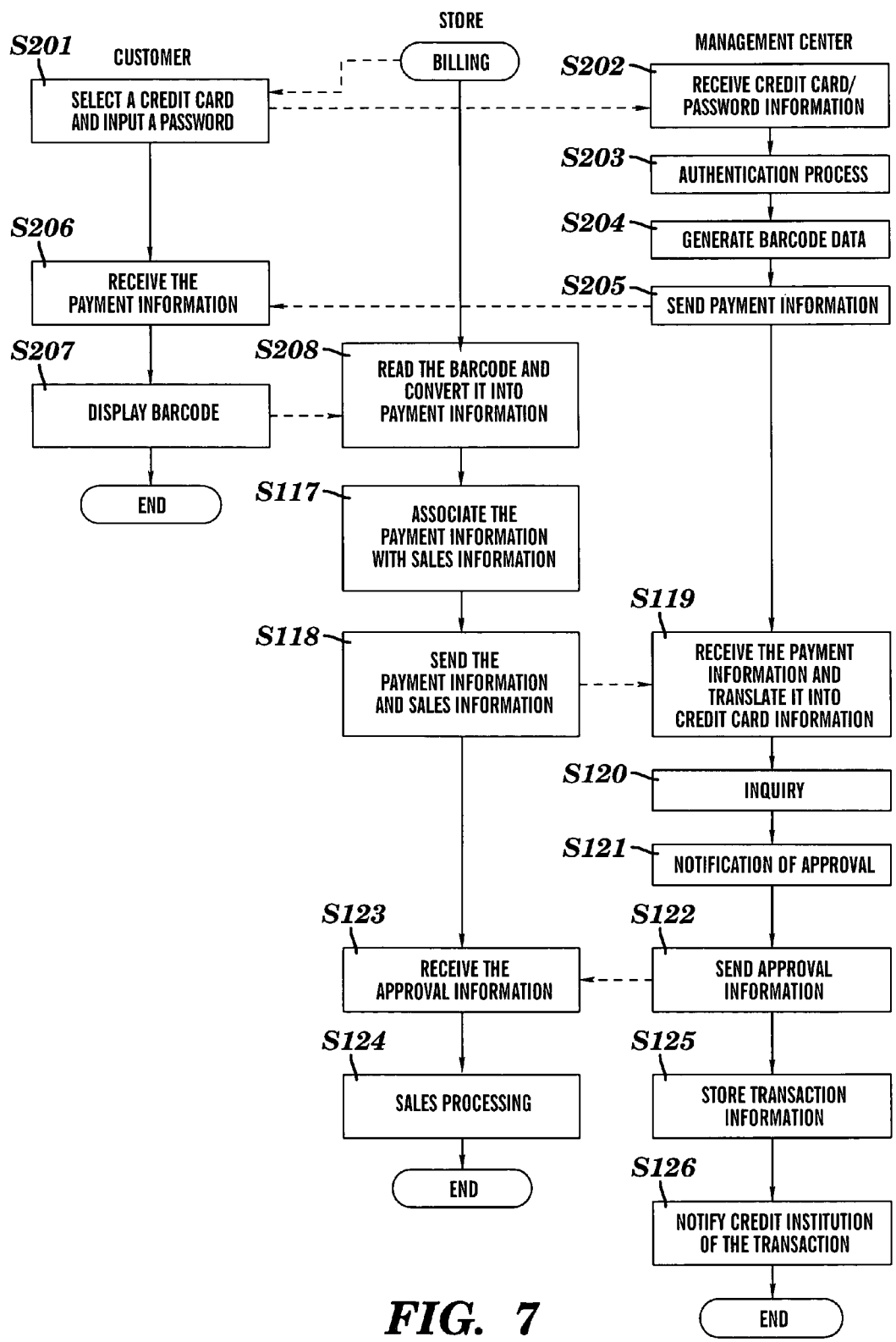
FIG. 7 shows a flow of a payment process using a barcode.

As shown in FIG. 7, when the customer wants to pay for an amount billed at a store 20, the customer selects a credit card type (and a card if more than one within a type) to be used and inputs a password. The input information is transferred to the server 30 of the management center through a communication section (not shown) to request the issue of an identification code from the server 30 of the management center (step S201 in FIG. 7, (1) in FIG. 6). A customer process section 31 receives information on the credit card type/card selected and the password through a customer communication section 34 (step S202), then performs an authentication process by checking the password (step S203).

After the completion of the authentication process, the customer process section 31 generates, as payment information to be presented by the customer to the store 20, data (character string data) containing the telephone number of the customer's portable communications terminal 10 and the credit card type/card (selected) to be used. Then, based on this data, the management center generates a two-dimensional barcode data in image data form (step S204).

Figure 8A:
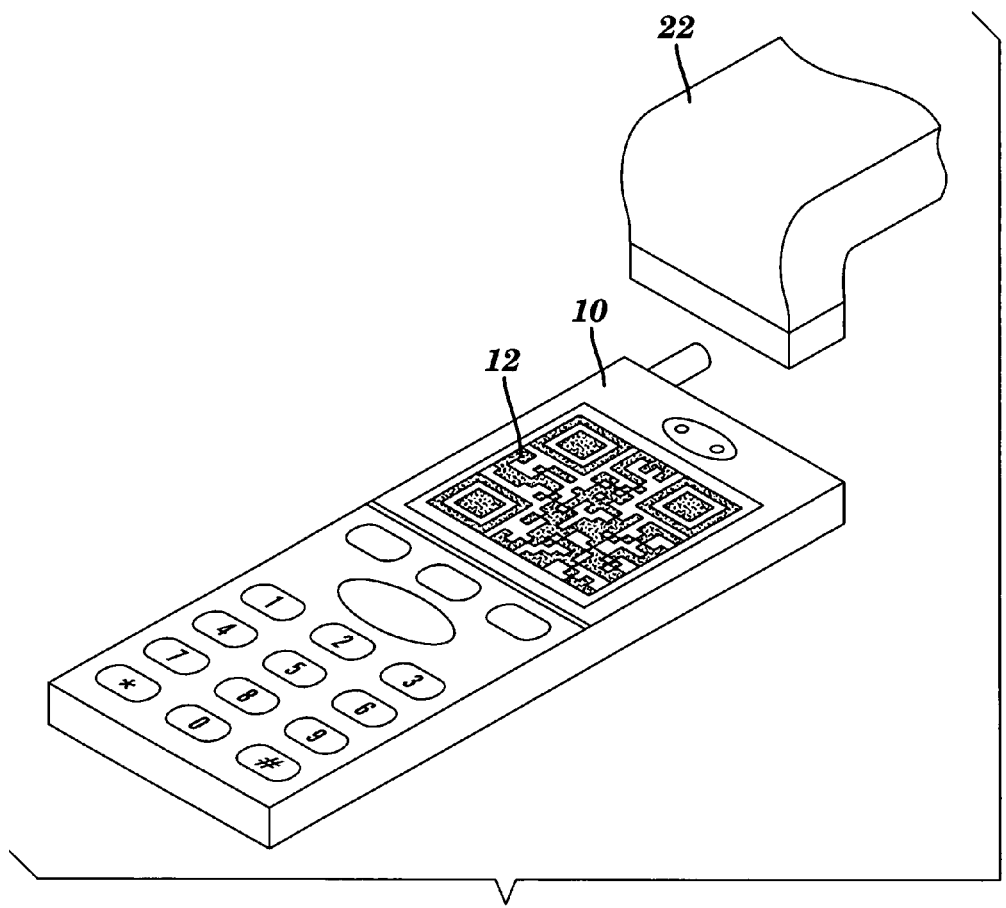
FIG. 8A shows a two-dimensional barcode displayed on the portable communications terminal.
Figure 8B:
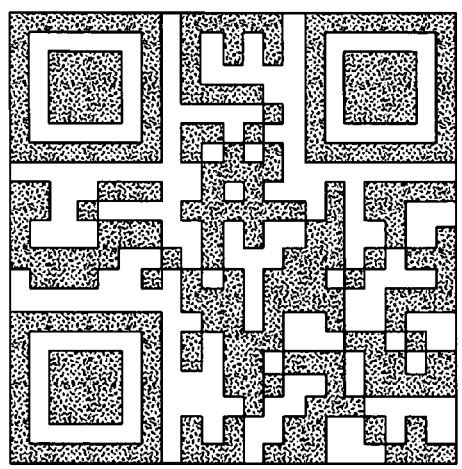
FIG. 8B shows an example of the two-dimensional barcode.

The two-dimensional barcode used is preferably a QR code in matrix (see FIG. 8B) or a data code that can be read reliably when the code is displayed on the display 12 of the portable communications terminal 10 as shown in FIG. 8A in view of the relation between the resolution of the display 12, i.e., the liquid-crystal panel and the readability of the barcode reader 22. It is also preferable for an electronic watermark to be embedded in the two-dimensional barcode data in order to prevent the data from being fraudulently used by copying it.

The two-dimensional barcode data generated in this way is transferred to the customer's portable communications terminal 10 through the customer communication section 34 as payment information (step S205 in FIG. 7, (2) in FIG. 6).

When the portable communications terminal 10 receives the two-dimensional barcode data as payment information (step S206), a two-dimensional barcode based on this data is automatically displayed on the display 12 (step S207) by a display control means (not shown). The customer sees this two-dimensional barcode and presents the barcode displayed on the display 12 to the store.

The two-dimensional barcode displayed on the display 12 of the portable communications terminal 10 presented by the customer is read by the barcode reader 22 at the store 20, as shown in FIG. 8A. The cash register 21 converts the two-dimensional barcode read by the barcode reader 22 into character string data and further resolves (analyzes) it based on a predetermined rule to obtain the telephone number of the customer's portable communications terminal 10 and credit card type/card (selected) to be used. The information obtained is the payment information (step S208 in FIG. 7, (3) in FIG. 6).

The subsequent inquiry process performed via the server 30 of the management center and sales process at the store 20 are the same as those at step S117 and subsequent steps shown in FIG. 4 in the first embodiment. Therefore, the description thereof is omitted for brevity's sake.

According to the configuration as described above, the customer displays the two-dimensional barcode issued by the server 30 of the management center as the payment information on the portable communication terminal 10 and has the barcode reader 22 at the store read the barcode. Thus, payment using a credit card can be made without using the credit card number. In addition, because the embodiment is configured in a manner that only the telephone number of the portable communications terminal 10 and the credit card type/card (credit card company name) used by the customer are presented to the store 20 as payment information, the credit card number is not required to be presented to the store 20. Furthermore, the two-dimensional barcode is issued by presenting a password to the server 30 of the management center and the portable communications terminal 10 itself does not store a credit card number and the like information. In this way, the system security can be improved, a bulky wallet containing credit cards can be avoided, and other advantages similar to the first embodiment can be achieved.

In the configuration according to the first embodiment, a wireless transmitter must be provided in the portable communications terminal 10 and a wireless receiver must be provided in the cash register 21 at the store 20, so that the customer can send the payment information to the store 20 side. According to the second embodiment, on the other hand, the two-dimensional barcode is displayed on the portable communications terminal 10 and it is read by the barcode reader 22 at the store 20. Because the two-dimensional barcode transferred from the server 30 of the management center is in image data format, the two-dimensional barcode can be displayed on the display 12 with a browser function and an image display function conventionally provided in the portable communications terminal 10, without adding any special functionality. All the store 20 needs to newly install is a barcode reader 22 for two-dimensional barcode. Thus, compared with the first embodiment, the configuration of the second embodiment can be implemented with the minimum (or no) to the customer and the minimum investment by the store 20.

Third Embodiment: Confirmation of Payment

As a third embodiment, an example will be shown in which a payment confirmation process is performed by a server 30 of a management center with the customer's portable communications terminal 10 during a series of processes in order to further improve the security of this system.

In the following description, the description of configurations common to the above-described first and second embodiments will be omitted.

Figure 9:
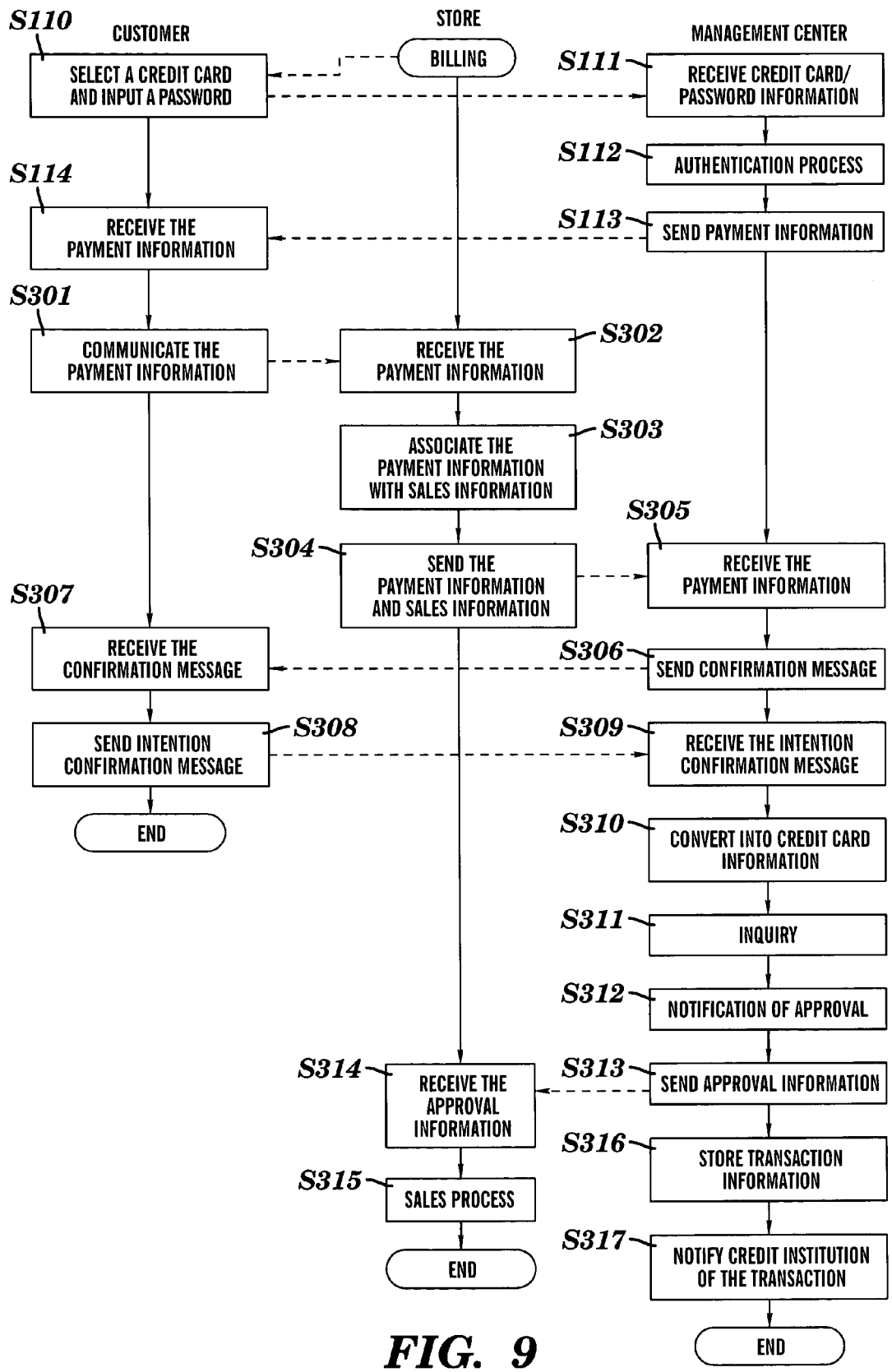
FIG. 9 shows a process flow for confirming payment with a customer according to a third embodiment.

According to the third embodiment, a customer receives payment information issued from a server 30 of a management center by the process similar to the process at steps S110 through S114 in the first embodiment (or steps S201 through S206 in the second embodiment) as shown in FIG. 9. The customer then presents/communicates the issued payment information to a store 20 by using a two-dimensional barcode or by wireless transmission (step S301). A cash register 21 at the store 20 reads or receives the payment information at step 302, associates the payment information with sales information (step S303), then sends it to the server 30 of the management center (step S304).

In the server 30, which receives the information at step S305, a customer process section 31, acting as a process confirmation section, sends a payment confirmation message to the customer's terminal 10 through a customer communication section 34 (step S306).

The confirmation message is used to confirm payment with the customer and may ask the customer whether, for example, "Payment OK?" or may include details of payment such as a credit card to be used and amount to be paid to confirm the customer's intention to pay.

The customer receives the confirmation message on the portable communications terminal 10 at step S307 and, in response to it, sends back a message confirming the payment to the server 30 of the management center (step S308).

Then, the management center server 30, which receives the payment confirmation message from the customer at step S309, converts it into the customer's actual credit card information based on the payment and sales information, which the server 30 has already received from the store 20 (step S310), and inquires of the credit card company about the payment (step S311).

When an approval notification and approval number are sent from the credit company to the management center server 30 (step S312), the approval number is sent to the cash register 21 at the store 20 through a store communication section 35 (step S313).

The cash register 21 at store 20, which receives the approval number at step S314, performs a sales process for the customer (step S315). The management center server 30 stores transaction information in an account DB 38 (step S316) and notifies the credit institution of the transaction (step S317).

According to the configuration as described above, the management center server 30 confirms the payment with the customer before the credit card payment inquiry in the management center server 30 and the sales process at store 20. Therefore, the security of the system can be improved.

While in the third embodiment the customer presents the payment information to the store 20 with a two-dimensional barcode or by wireless transmission, the configuration is not limited to such a presentation method. The above-described configuration may be applied to an arrangement in which the customer or a clerk at the store 20 inputs the payment information data, sent from the management center server 30 to the portable communications terminal 10, into the cash register 21 through a ten-key keypad, or the customer orally communicates it to the store 20.

Fourth Embodiment: Use of One-time Code

Figure 10:
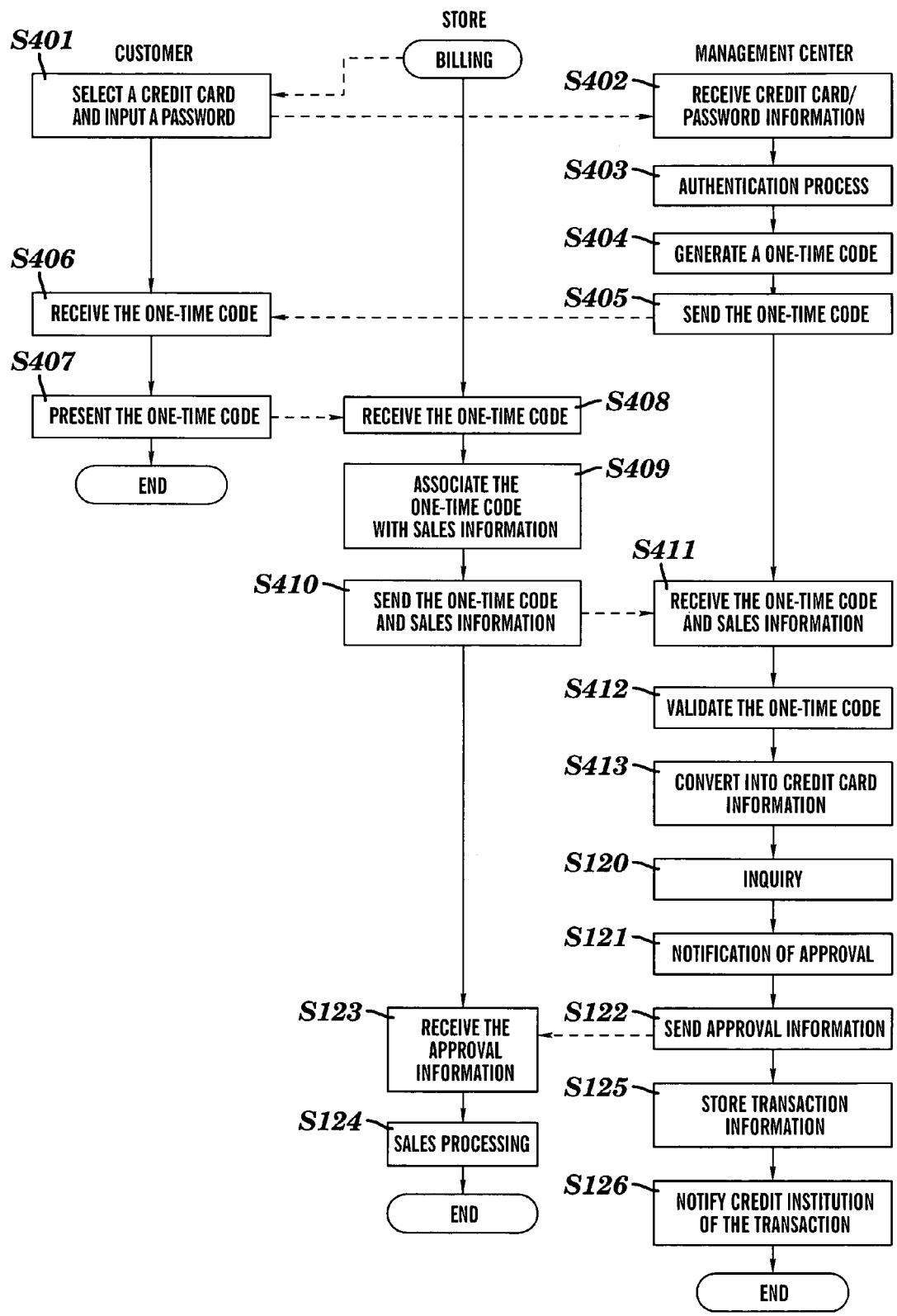
FIG. 10 shows a process flow in a case where a one-time code is used according to a fourth embodiment.
Figure 11:
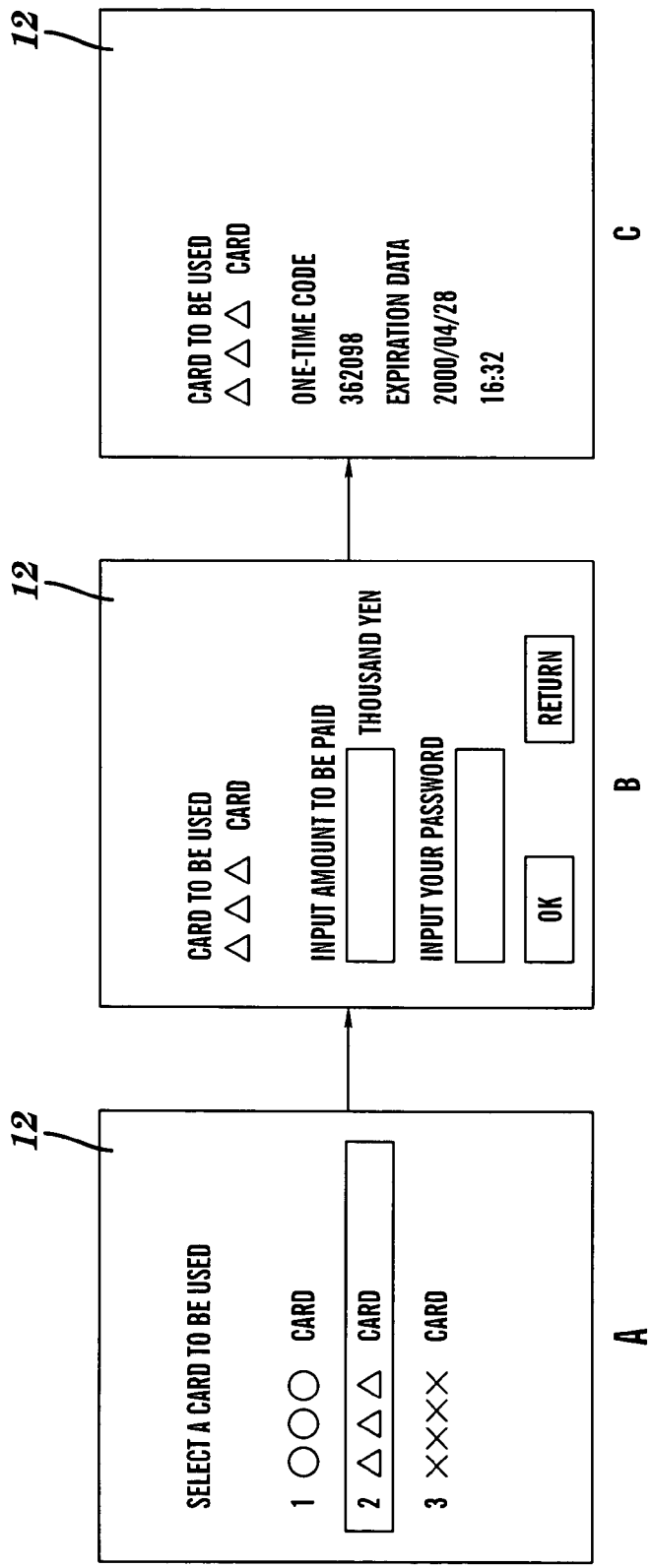
FIGS. 11A-11B show a screen displayed on the portable communications terminal of the customer displayed during the process shown in FIG. 10.

FIG. 10 is a diagram for illustrating a general configuration of a cardless payment system according to a fourth embodiment. FIG. 11 shows an example of information displayed on the display 12 of a portable communications terminal 10 of the fourth embodiment.

The card payment system of the present invention communicates a one-time code (identification code) issued by a server 30 at a management center to a cash register 21 at the store 20 from the portable communications terminal 10 when a customer wants to pay for a purchase at the store 20. The store receives the one-time code and performs accounting for the payment.

In the following description, only the configurations and processes that differs from the first and second embodiments will be described and the description of the same configurations and processes as the first and second embodiments will be omitted.

As shown in FIG. 10, when the customer pays for the purchase at the store 20, the customer selects a credit card type/card to be used (see FIG. 11A) in the portable communication terminal 10 and inputs a password (see FIG. 11B). In addition, an amount to be paid may be entered. Then, the input information is transferred to the server 30 of the management center through a communication section (not shown) (step S401). A customer process section 31 receives the information on the selected credit card type and password through a customer communication section 34 (step S402). Process section 31 then performs an authentication process by checking the password (step S403).

After the completion of the authentication process, the customer process section 31 generates a one-time code, which is a character string consisting of random digits (step S404) as a payment information presented by a customer to the store 20. The one-time code can be used only once and it is preferable for security that a period, after which the code becomes invalid is set, e.g., 24 hours.

The one-time code generated in the customer process section 31 is transferred as payment information to the customer's portable communications terminal 10 through the customer communication section 34 (step S405, see FIG. 11C). Here, the one-time code may be transformed into a two-dimensional barcode before the transfer, as in the second embodiment.

The portable communications terminal 10 receives the one-time code or two-dimensional barcode data (step S406). If the one-time code is received in the form of two-dimensional barcode data, the two-dimensional barcode is automatically displayed on the display 12 and the customer presents it to the store 20 (step S407). If the one-time code is sent by wireless communication, the received one-time code data is sent from the portable communications terminal 10 to a cash register 21. Alternatively, the received one-time code may be input in the register 21 by the customer or a clerk of the store 20 through a ten-key keypad.

The cash register 21 at the store 20, which receives the one-time code through the above-mentioned means at step S408, obtains the one-time code or the one-time code derived from the two-dimensional barcode and the telephone number sent from the portable communications terminal 10 as the customer's payment information.

The cash register 21 associates the payment information with sales information of the customer (step S409), then sends the payment and sales information to a store process section 32 of the management center server 30 (step S410).

The store process section 32, which receives the payment and sales information of the customer from the store 20 at step S411, makes reference to a customer DB 37 based on the one-time code contained in the customer's payment information to determine if the one-time code is valid or not (step S412). Then, credit card information such as the credit card number, expiration date, and status of credit card selected by the customer is obtained from data corresponding to the one-time code (step S413).

The subsequent steps are the same as step S120 and subsequent steps shown in FIG. 4 in the first embodiment. That is, payment inquiry of a credit institution is performed and, after approval, an approval number is sent to the store 20 through a store communication section 35. When the store 20 receives the approval number, it performs a sales process for the customer in a manner similar to that for conventional payment by credit card. The server 30 of the management server stores transaction information in an account DB 38.

According to the configuration described above, the customer communicates the one-time code provided from the management center server 30 to the portable communication terminal 10, which is held by the customer, to the store 20. Thus, effects similar to those of the first embodiment can be achieved and, in addition, a higher security can be achieved and the anonymity of the customer to the store 20 can be increased because the telephone number of the portable communications terminal 10 is not revealed to the store 20.

While in the fourth embodiment the one-time code and the telephone number are communicated from the customer's portable communications terminal 10 to the store 20, the embodiment is not limited to that configuration and the one-time code by itself may be communicated. Furthermore, when the customer receives the one-time code issued from the management center server 30, the customer may set the highest limit of amount available.

While in the first to fourth embodiments described above, after receiving the identification code, two-dimensional barcode, or one-time code from the management center server 30, the customer provides it to the store 20, the embodiment is not limited to that configuration. For example, a process flow as shown in FIGS. 12A-12D or FIGS. 13A-14C may be used. FIGS. 12A-D, 13A-C, and 14A-C show examples of information displayed on the display 12 of customer's portable communications terminal 10 and the display 21a of a cash register 21 at a store 20.

Figure 12:
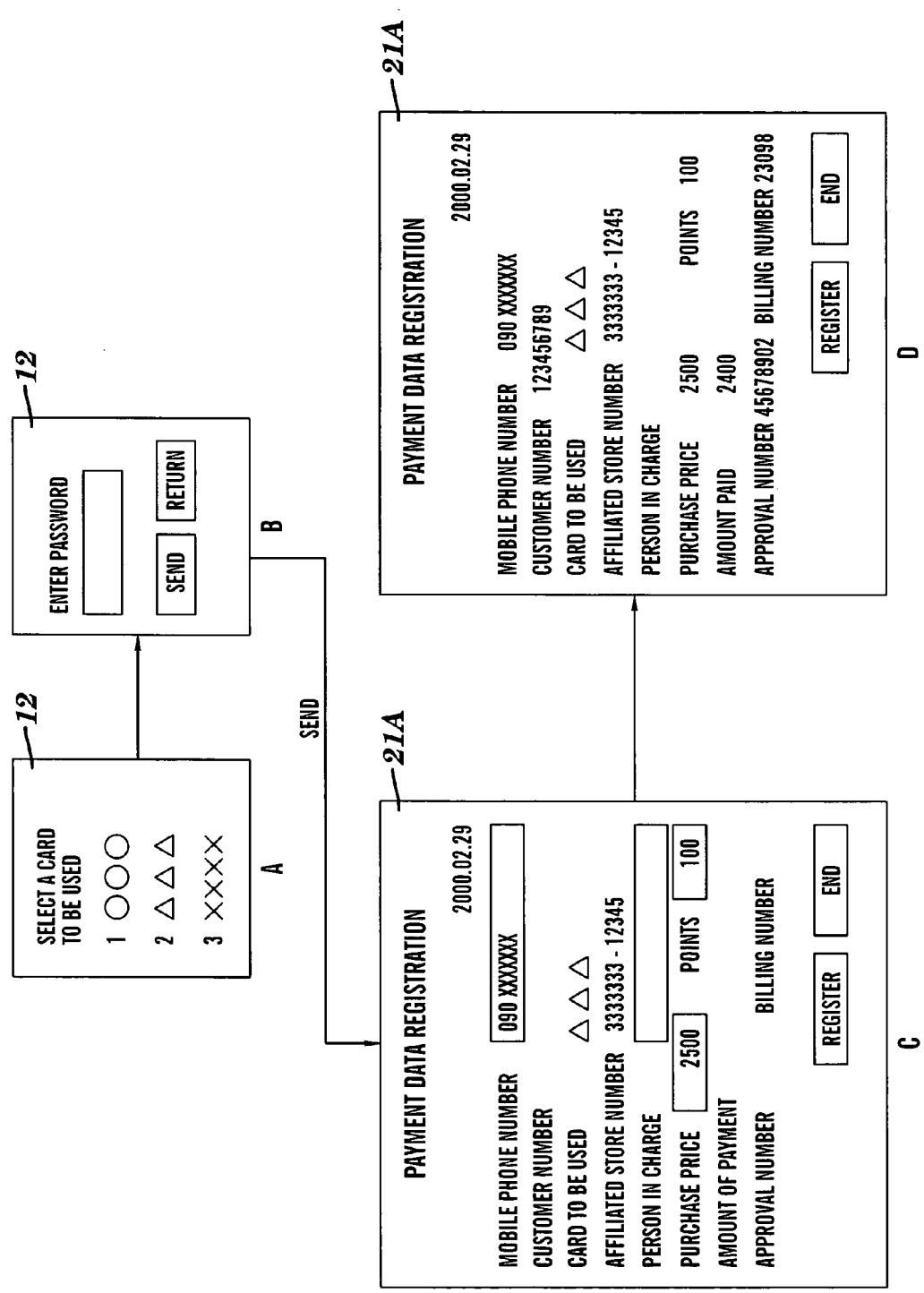
FIGS. 12A-12B show an example of screens displayed during another process flow.

On the display 12 of customer's portable communications terminal 10, the customer first selects a credit card to be used, as shown in FIG. 12A, then inputs a password as shown in FIG. 12B. Because data on a valid password is stored in the portable communications terminal 10, the authentication of the password is performed on the portable communications terminal 10 itself without accessing a management center server 30. If the password is valid, information on the telephone number of the portable communications terminal 10 and the selected credit card are sent to the cash register 21 at the store 20 by wireless communication as described in the first embodiment.

The cash register 21, which receives the information, accepts the input of the received telephone number of the portable communications terminal 10 and information on the credit card, and displays the information on the display 21a, as shown in FIG. 12C. Then, after sales information such as amount billed is input in the display 21a, the register 21 accesses the management center server 30 to send the telephone number of the portable communications terminal 10, the credit card type/card, and the sales information to the server 30. The management center server 30 identifies the customer based on the received telephone number of the portable communications terminal 10 and inquires of the credit company about the selected credit card. After the approval of the payment, the customer number and approval number are sent back to the store 20. The customer number and approval number are displayed on the cash register 21 which received the reply, as shown in FIG. 12D. Then, conventional sales processing is performed.

In this example, the customer does not need to access the management center server 30 beforehand and the inconvenience to the customer can be eliminated.

Figure 13:
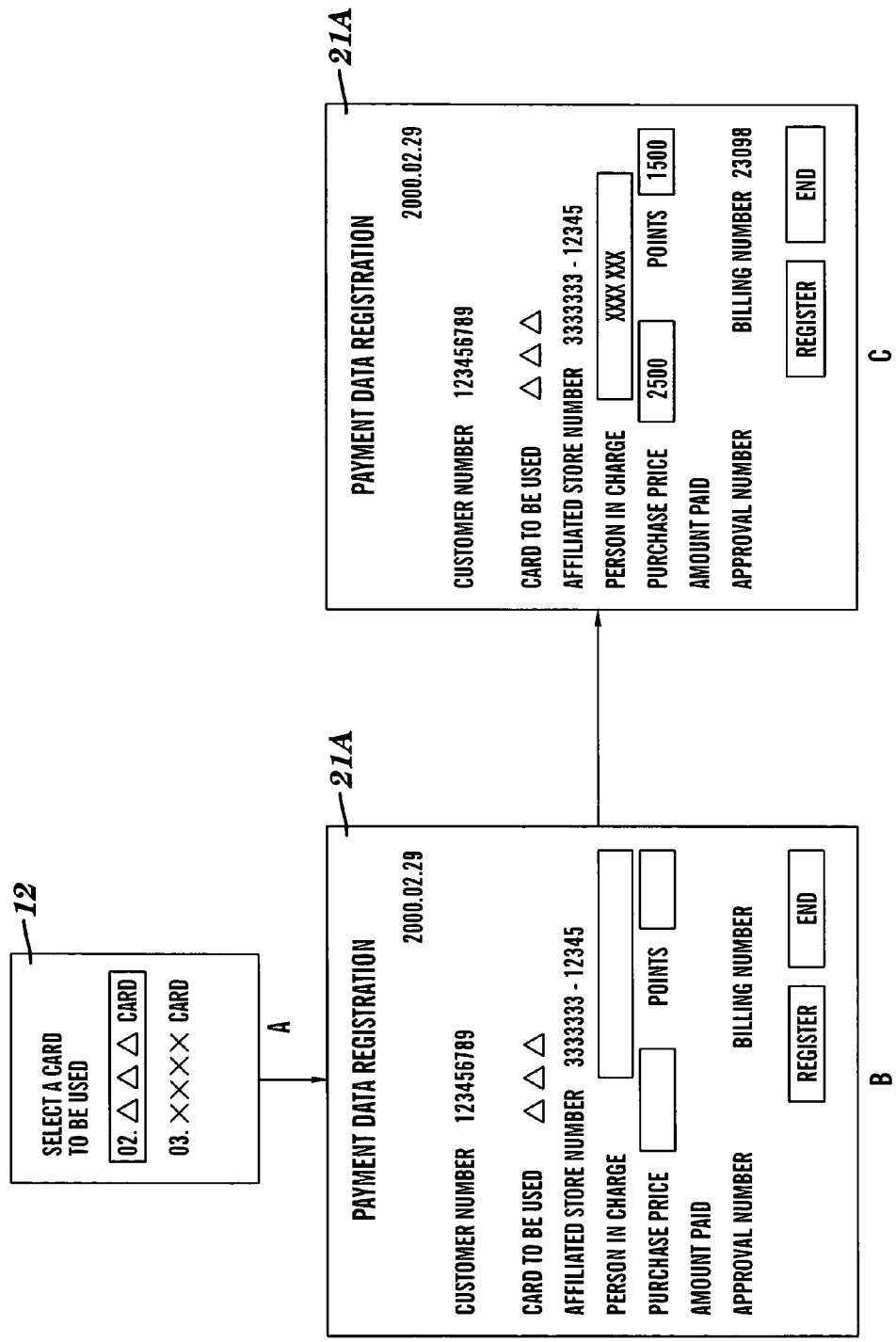
FIGS. 13A-13C show an example of screens displayed during yet another process flow.
Figure 14:
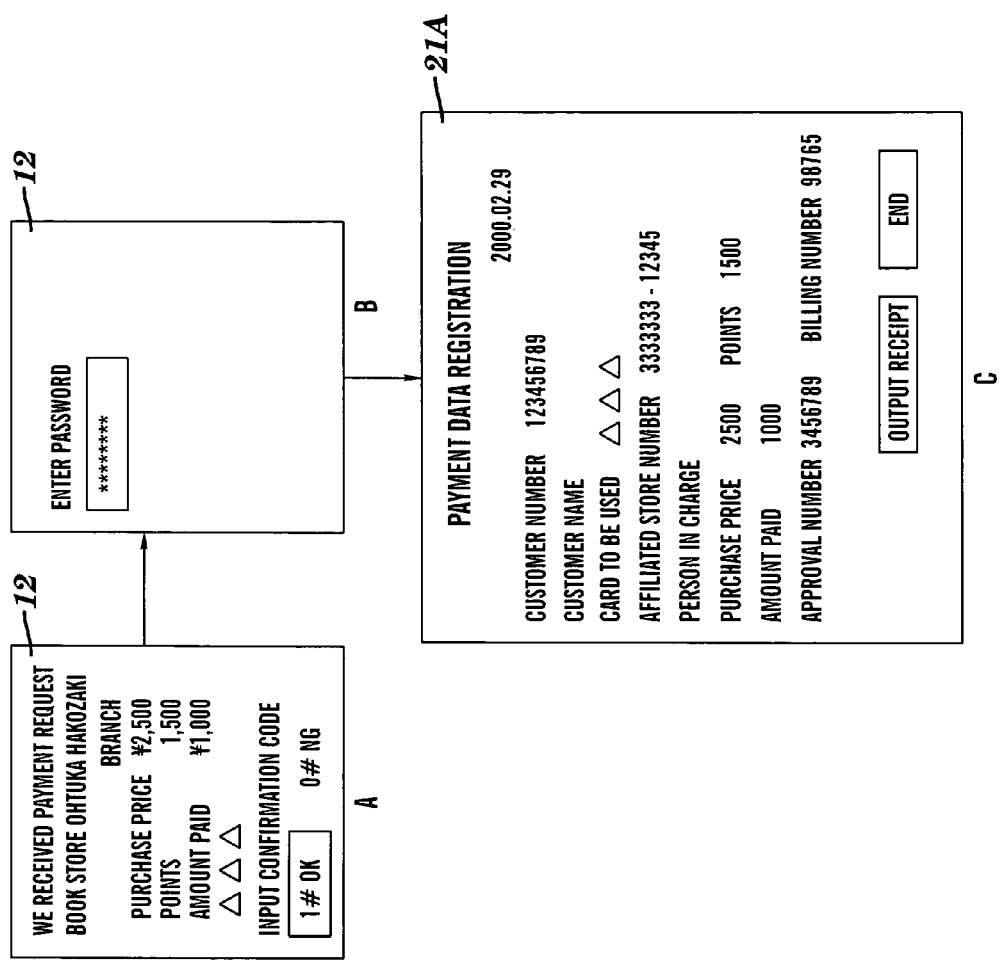
FIGS. 14A-14C show an example of screens displayed during a process following the process shown in FIGS. 13A-C.

In the examples shown in FIGS. 13-14, a customer first selects a credit card to be used on the display 12 of his/her portable communications terminal 10 (see FIG. 13A). Then, the portable communication terminal 10 wirelessly sends information on the telephone number of the portable communications terminal 10 and the selected credit card to a cash register 21 at the store 20. The cash register 21, which receives the information, accepts the input of the telephone number of the portable communications terminal 10 and information on the credit card as shown in FIG. 13B and displays this information on the display 21A. After sales information such as an amount billed is input in the display 21a, as shown in FIG. 13C, the management center serve 30 is accessed and the telephone number of the portable communications terminal 10, the credit card type/card, and the sales information are sent to the management center server 30.

The management center server 30 identifies the customer based on the telephone number of the portable communications terminal 10 and, at this point, sends to the portable communications terminal 10 a message indicating that it has received a payment request from the store 20, as shown in FIG. 14A. The customer, in response to the message, checks the information in the message and sends back a confirmation message ("confirmation code" in FIG. 14A) to the management center server 30.

After receiving a confirmation message indicating "OK" from the customer, the management center server 30 request the input of a password from the customer, as shown in FIG. 14B. After a valid password is input by the customer through the portable communications terminal 10, the management center server 30 inquires of the credit card company about the selected credit card for the payment. When the payment is approved by the company, the customer number and approval number are sent back to the store 20. The customer number and approval number are displayed on the cash register 21 which received the reply, as shown in FIG. 14C. Then, conventional sales processing is performed.

In this example, the customer does not need to access the management center server 30 beforehand and the inconvenience to the customer can be eliminated.

Fifth Embodiment: Membership Card

An example of a membership card management system as a fifth embodiment will be described below. The membership card management system is a system for providing points according to a price, or other convenient measurement, each time a customer purchases goods or a service and giving a discount, or other benefit, on a later purchase according to the number of accumulated points.

Figure 15:
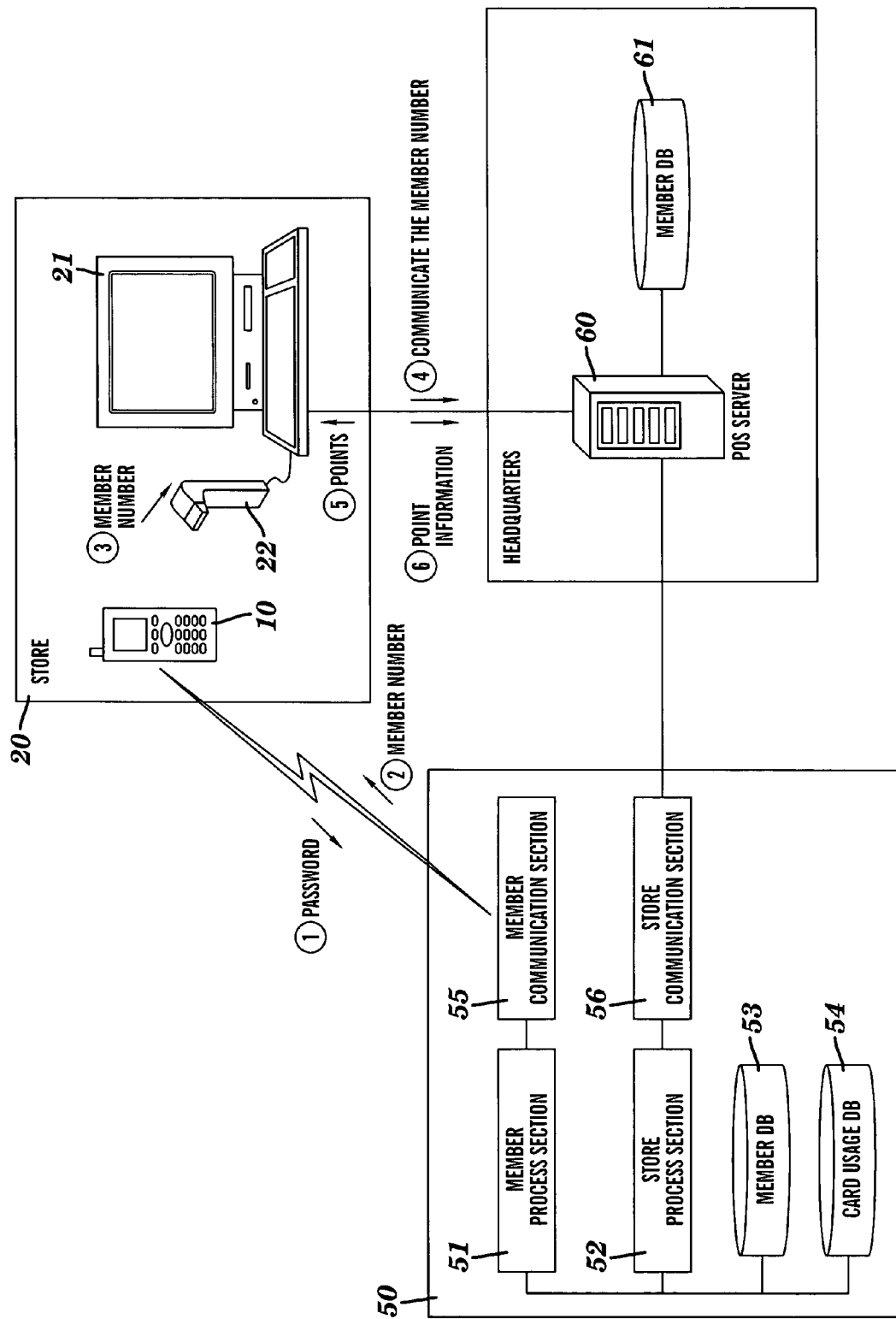
FIG. 15 shows a system configuration in which a membership card point process is performed according to a fifth embodiment.

As shown in FIG. 15, a server (data management server, external server) 50 of a membership card management center comprises a member (customer) process section (card issuer) 51, store process section (instruction information issuer) 52, member DB (data storage) 53, and card usage DB (data storage) 54.

The member process section 51 can communicate data to and from a portable communication terminal 10 held by each member through a member communication section (customer communication section) 55 over a dial-up network or other network such as the Internet. The store process section 52 is connected to a cash register 21 at a store 20 through store communication section (process executer communication section) 56 over a dedicated line. A POS server 60 at a place such as the headquarters controlling the store 20, may be provided between the cash register 21 of the store 20 and the server 50 of the management center. In such a case, the POS server 60 may include a member data DB 61 containing personal information about members and membership card point information.

The member DB 53 contains, as registration information, personal information such as the name and address of a member associated with a member number. The card usage DB 54 contains the telephone number of a portable communications terminal 10 pre-registered by the member, a password, points which increase or decrease according to the usage of the card, and other information associated with the member number.

In the above-described configuration, when a member makes a purchase at the store 20 and pays for the purchase, the member accesses the server 50 of the management center through his/her portable communications terminal 10. Here, when the member inputs a password on the display 12, the input password and the telephone number of the portable communications terminal 10 are sent from the portable communications terminal 10 to the server 50 of the management center ((1) in FIG. 15).

The server 50 of the management center, which receives this information, makes reference to the card usage DB 54 to obtain a member number information associated with the received telephone number and password. The server 50 converts the member number information into two-dimensional barcode data, then sends it to the portable communications terminal 10 through the member communication section 55 ((2) in FIG. 15).

When the portable communications terminal 10 receives this data, the two-dimensional barcode is displayed on the display 12. The customer present this two-dimensional barcode to the store 20 as his/her identification code.

The presented two-dimensional barcode is read by a barcode reader 22 provided for the cash register 21 at the store 20 and the read information (member number) is communicated to the sever 50 of the management center ((3) and (4) in FIG. 15).

The server 50 of the management center makes reference to the card usage DB 54 based on the two-dimensional barcode information, i.e., the member number, provided by the store 20 to retrieve the number of points held by the member associated with the member number and sends the data to the store 20 ((5) in FIG. 15).

The store 20 asks the member whether he/she would like to use his/her points and performs discounting according to the points if the member wants to use the points. Points are added or subtracted to or from the points according to the use of the points based on data of the number of points sent from the server 50 of the management center as instructions and reply information.

Information about the resulting points after the addition or subtraction is sent to the server 50 of the management center along with the member number, usage date and time, an other usage information ((6) in FIG. 15). The server 50 of the management center updates information in the card usage DB 54 based on the received information. If the POS server 60 contains a member data DB 61, the updates of the card usage DB 54 are reflected in the member data DB 61 online or by a batch process at a certain intervals.

According to this member management system, the member can use the membership system through the portable communications terminal 10 without the need for carrying his/her membership card. Thus, a membership card loss can be prevented and a bulky wallet with cards can be avoided, allowing a highly convenient system to be provided to the customer.

In the above-described management system, the member can be registered online. That is, an applicant for membership accesses the management center server 50 through his/her portable communications terminal 10 to input required information such as his/her address, name, and password. The management center server 50, which receives the information, provides a member number to the applicant, associates the input information and the information such as the telephone number sent from the portable communications terminal 10 with the member number and stores them in the member DB 53 and card usage DB 54.

The management center server 50 (member DB 53, card usage DB 54) and the store headquarters POS server 60 (member DB 61) holding the information about the member in this way can send direct mail (electronic mail or a message displayed on the display 12) to each portable communications terminal 10 based on the telephone number of the portable communications terminal 10 held by each member.

Like the first through fourth embodiments, the fifth embodiment may request the member to enter a password at an appropriate time during the use of the card in order to improve security.

While in the fifth embodiment the management center server 50 manages member cards, the management center server 50 may perform management of other types of cards such as credit cards besides the member cards in a way similar to that of the first through fourth embodiments. In such a case, the member may be entitled to benefits of the membership card when paying for purchases.

Figure 16:
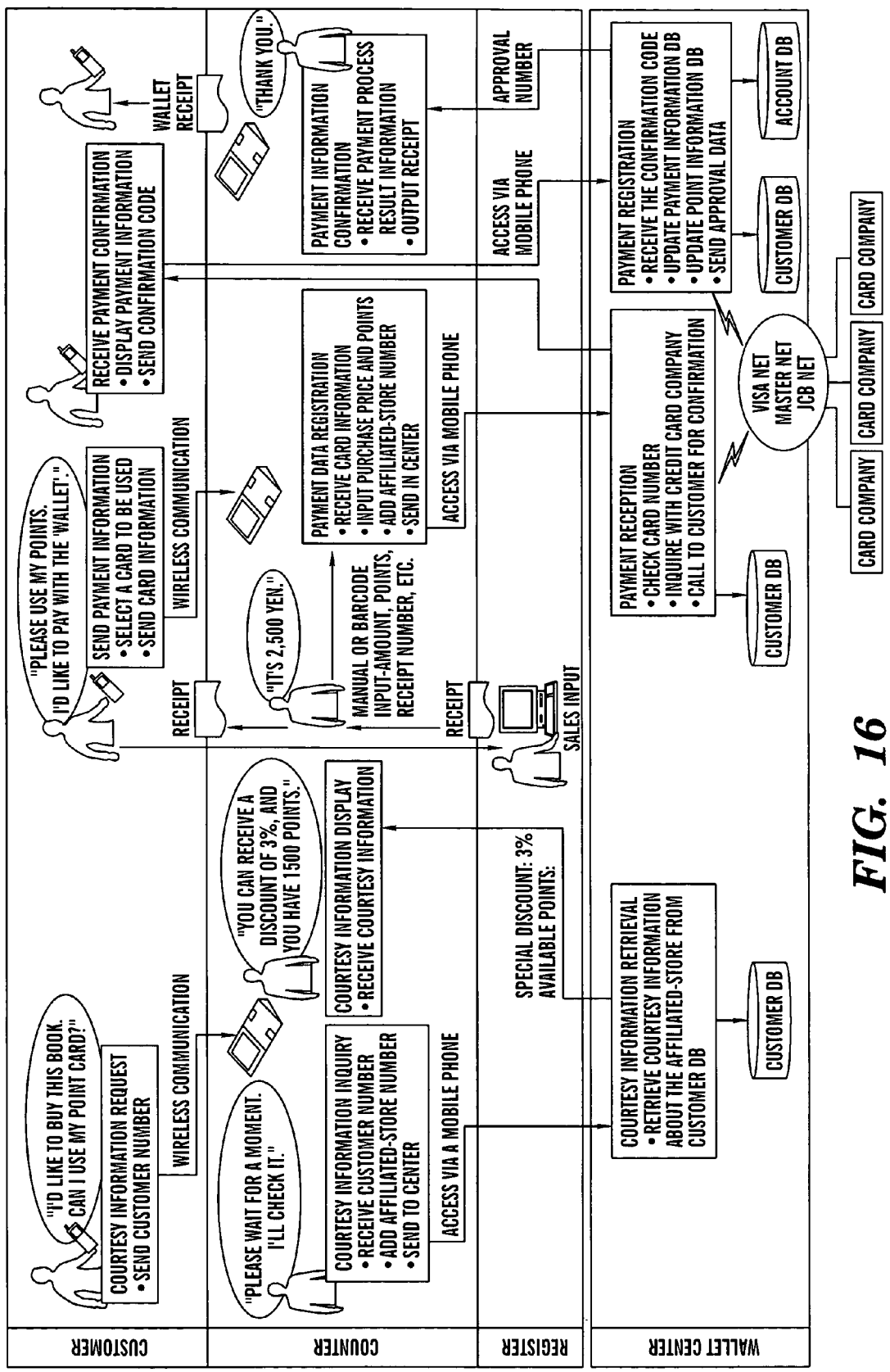
FIG. 16 shows a process flow in a system in which the configurations of the first, third, and fifth embodiments are combined.
Figure 17:
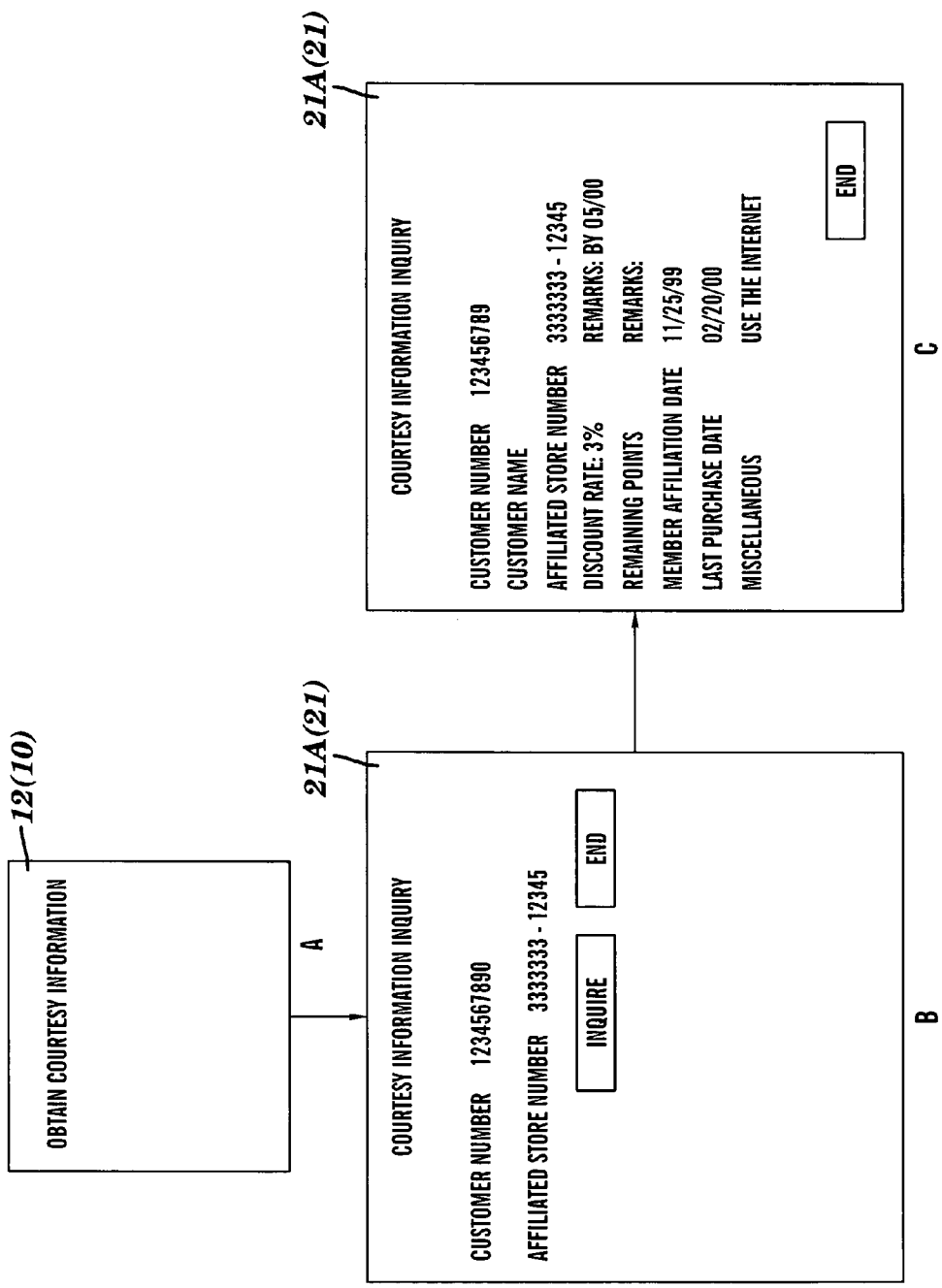
FIGS. 17A-17C show an example of screens displayed during the process shown in FIG. 16.

FIGS. 16 and 17 show an example of this specific implementation. For purchasing goods, a customer (member) accesses a cash register 21 ("Register" in FIG. 16) from his/her portable communications terminal 10 by wireless. The customer may do this, for example, to send his/her customer number, which is card information, to the cash register 21 to request courtesy information (see FIG. 17A). The cash register 21 adds an affiliated store number to the received customer number by accessing a server 50 of a management center ("wallet center" in FIG. 16) through a portable communication terminal 10 to inquire of the server 50 about the customer's courtesy information (see FIG. 17B). The server 50 of the management center searches for the database of the customer and sends the customer's courtesy information relating to the affiliated store back to the cash register 21 of the affiliated store to display it on the display 21A (see FIG. 17C). The customer uses the courtesy information to make decisions about purchases according to the courtesy information displayed, communicates it to the clerk and the clerk calculates the sales. The customer wirelessly accesses the cash register 21 from the portable communications terminal 10 to send card select information, and inputs information about a credit card to be used. The store adds payment information and customer added-value information to the sent credit card information and sends it to the management center server 50 from the portable communication terminal 10. The management center server 50 checks the card information based on the sent credit card information and inquires of the card issuer about the credit card information. Then, the server 50 automatically calls the customer's portable communications terminal 10 and sends payment information to it. The customer checks the sent payment information and sends a certification code, which is personal authentication information, to the management center server 50. The management center server 50 checks the confirmation code, then performs a payment accounting process, updates the payment information and customer added-value information in the customer's database, sends a notification of the completion of the payment to the cash register 21, displays it on the cash register 21, and sends the payment process information to the card issuer.

Sixth Embodiment: Collection Agency

As a sixth embodiment, an example will be shown in which payments for goods ordered online over a network such as the Internet, or utility charges such as telephone, water, and electricity, tax, and house/rent bills, are made at a store 20 such as a convenience store.

Figure 18:
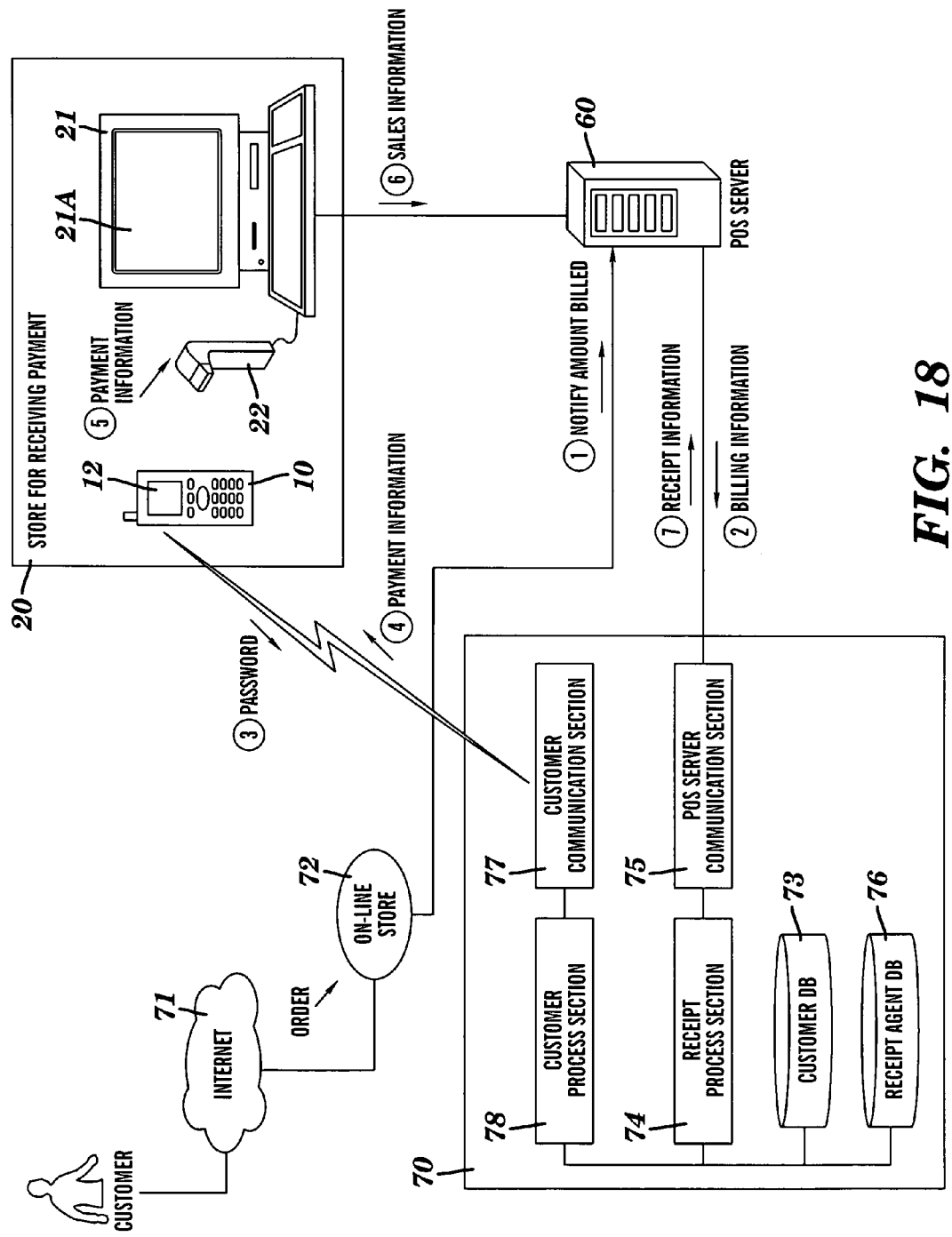
FIG. 18 shows a system configuration in which a receipt agent process is performed according to a sixth embodiment.

As shown in FIG. 18, when the customer orders goods or a service from an online store 72 on the Web through the Internet 71 by using a personal computer (PC), Personal Digital Assistant (PDA), or portable communications terminal 10, for example, the customer can specify a receipt agent system according to the present embodiment for payment through the server 70 of the management center (data management server, external server).

The customer pre-registers his/her name, address, the telephone number of the portable communications terminal 10, password set by the customer, or other information as registration information in the server 70 of the management center. The management center server 70 stores the registered information in a customer DB (data storage) 73.

When ordering from the online store 72, the customer communicates the telephone number of the portable communications terminal 10 held by the customer and used during the payment to the online store 72 as information for identifying the customer.

When the online store 72 receives the information, including an amount claimed from the customer and the telephone number of the portable communications terminal 10, it sends it to a POS server 60 of the store headquarters ((1) in FIG. 18).

The POS server 60 of the headquarters generates billing information to provide to the management center server 70 based on the information received from the online store 72. The billing information may include, besides the telephone number of the portable communications terminal 10 for identifying the customer and the amount billed, a code identifying the online store 72, a transaction number issued by the POS server 60, and a due date. The billing information is sent to the management center server 70 through a POS server communication section (process executer communication section) 75 ((2) in FIG. 18). Then, a receipt process section (instruction information issue section) 74 in the management center server 70 stores the billing information received in a receipt agent DB (data storage) 76.

For the customer to make payments at a store 20, such as a convenience store, after placing an order with the online store 72, the customer first accesses the management center server 70 with the personal communication terminal and inputs a password ((3) in FIG. 18).

A customer process section (code issuing section) 78 of the management center server 70, which receives the passwords through a customer communication section 77, processes an authentication process for the customer. This is provided by making reference to a receipt agent DB 76 based on the telephone number of the portable communications terminal 10 to obtain information about online billing. Then, the customer process section 78 sends payment information based on obtained information to the customer's portable communications terminal 10 ((4) in FIG. 18). The payment information may include the telephone number of the portable communications terminal 10, the name and code of the billing online store 72, a transaction number, amount billed, a due date, etc. The payment information in this embodiment is preferably transmitted as two-dimensional barcode data.

If a number of billings are issued to the customer from the online store 72 or other stores, a request to select a store to which the customer wants to pay may be sent to the customer before sending the payment information.

When the payment information is sent from the management center server 70, the payment information is provided as a two-dimensional barcode displayed on the display 12 of the customer's terminal 10. The customer shows the two-dimensional barcode to the store 20 as an identification code.

The store 20 reads the two-dimensional barcode with a barcode reader 22 ((5) in FIG. 18). Then, a cash register 21 to which the barcode reader 22 is connected converts the two-dimensional barcode data into the payment information sent form the portable communications terminal 10 and the amount billed included in the payment information is displayed on the display 21A of the cash register 21 as instruction/reply information. The clerk of the store 20 orally communicates to the customer the amount billed displayed on the display 21A and receives the payment from the customer. The amount may be paid in cash or in a way provided in the description of the first to fourth embodiments.

When the store 20, which has received the payment from the customer, inputs information indicating the receipt to the cash registor 21, the telephone number of the portable communication terminal 10, the code of the online store 72, a transaction number, an amount sold, and a sales date are transferred from the register 21 to the POS server 60 as sales information ((6) in FIG. 18). The POS server 60 stores the transferred sales information in its database (not shown) and also transfers it to the receipt agent DB 76 of the management center server 70. Then, the management center server 70 stores the transferred sales information in the receipt agent DB 76 and provides receipt information to the online store 72 ((7) in FIG. 18). The receipt information is generated based on the sales information and includes the telephone number of the portable communications terminal 10 of the customer who paid, the transaction number, amount paid, receipt date, and receipt place (store 20).

As described above, the receipt agent system allows the customer to pay for goods ordered from the online store 72 at the store 20. Because the customer can receive the information about the payment to the online store 72 on the portable communications terminal 10 and present it to the store 20, the customer can paperlessly pay for the purchase without a written bill or other written statements.

In addition, because the two-dimensional barcode is used as payment information, all that the store 20 needs to newly install is a barcode reader 22 for two-dimensional barcode. The store 20 can therefore implement the above-described system at low cost.

While the sixth embodiment has been described with respect to an example in which the customer pays for goods or services ordered from the online store 72 at the store 20, the receipt agent system is not limited to this example. Instead, the system can be equally applied to a case where telephone, water, tax, house payments or rent, other charges are paid at the store 20. In such a case, again, a billing party sends payment information to the POS server 60 of the headquarters of the store 20 and the customer pays the charge at the store 20 according to the payment information (billing information) sent from the management center server 70.

While the sixth embodiment is configured in a manner that the customer uses the two-dimensional barcode to present the payment information to the store 20, the payment information may be communicated to the store by wireless or other means, like the first embodiment. In addition, while in the sixth embodiment the online store 72 provides customer billing information to the POS server 60 of the store headquarters, it may provide the billing information to the management center server 70. Furthermore, because the management center server 70 holds personal information such as the address and name of the customer, the management center server 70 may carry out the shipment of goods ordered by a customer by commission from the online store 72. In this case, the online store 72 adds the telephone number of the customer's portable communications terminal 10 to goods to be shipped and provides it to the management center server 70, thereby allowing the management center server 70 to identify the customer based on the telephone number to obtain the address and name of the customer and ship the goods.

Seventh Embodiment: Ticket

As a seventh embodiment, an example of a ticket processing system for issuing an admission ticket for an event such as a concert or sporting event, and performing an admission process will be described below.

Figure 19:
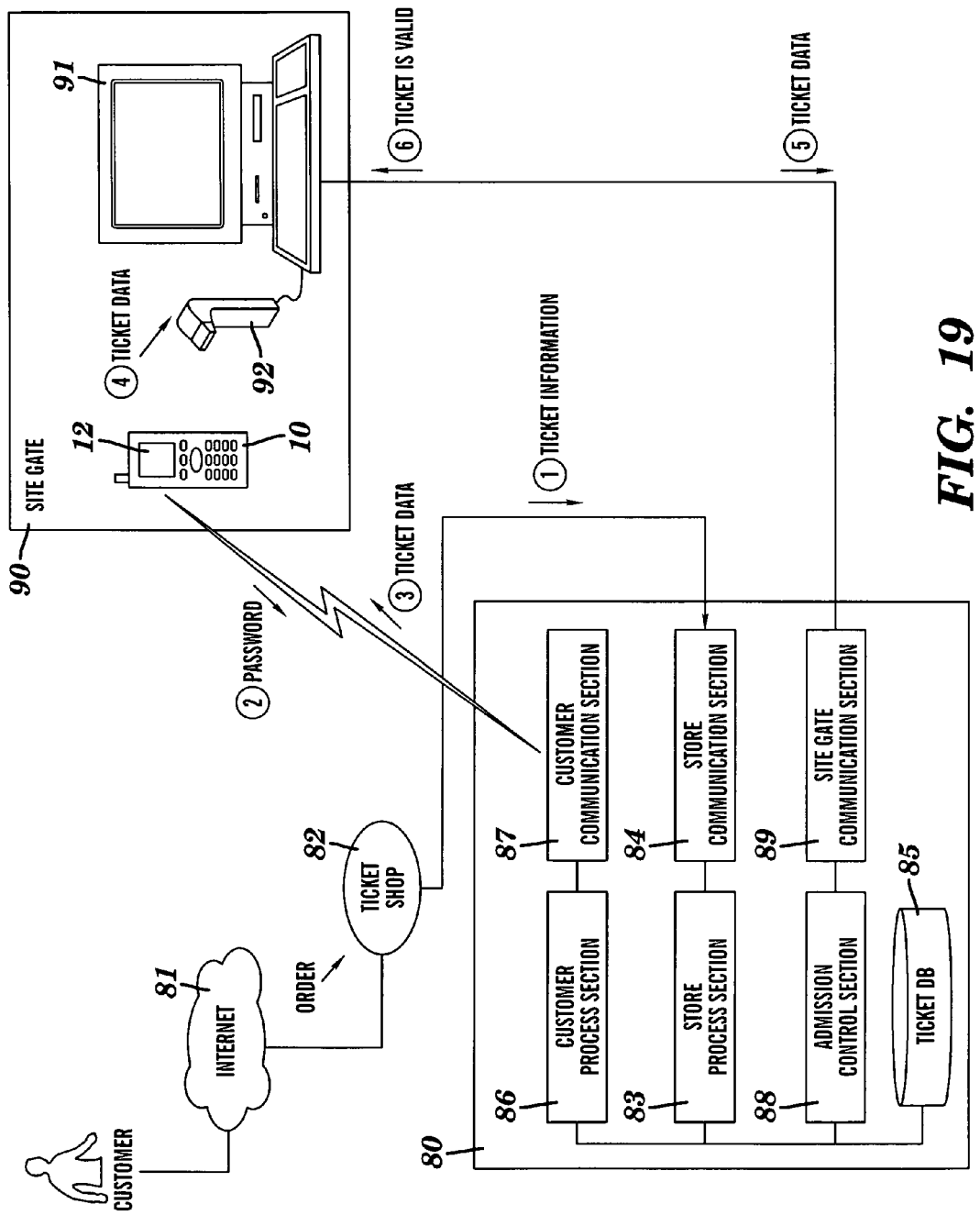
FIG. 19 shows a system configuration in which a ticket process is performed according to a seventh embodiment.

As shown in FIG. 19, a customer uses a personal computer (PC), PDA, or portable communications terminal 10 to order a desired ticket from a ticket shop 82 on the Web over the Internet 81. Payment for the ticket may be made by using a credit card number or other means, or may be made in a same way similar to that of the sixth embodiment.

When a customer orders a ticket, the customer communicates as an identification code for identifying the customer the telephone number of a portable communications terminal 10 that is held by the customer and to be used for later payment, which will be described later, to a ticket shop 82. The ticket shop 82, which receives the number, sends the telephone number of the customer's portable communications terminal 10, a ticket issue number, the event name, date and time, a seat number, and the like to a management center server (data management server, external server) 80 as ticket information ((1) shown in FIG. 19).

A store process section (instruction information issuing section) 83 of the management center server 80 stores the ticket information received from the ticket shop 82 through a store communication section 84 in a ticket DB (data storage) 85 as registration information.

When the customer subsequently goes to the event site, the customer first accesses the management center server 80 from the portable communications terminal 10 and inputs a password before entering the site ((2) in FIG. 19).

When a customer process section (code issuing section) 86 of the management center server 80 receives the password through a customer communication section 87, it performs an authentication process for the customer. This is performed by making reference to the ticket DB 85 based on the telephone number of the portable communication terminal 10 to retrieve information about the ticket that the customer ordered at the ticket shop 82. Then, customer process section 86 sends, based on the retrieved information, required ticket data (an identification code) to the customer's portable communications terminal 10 ((3) in FIG. 19). The ticket data may include, for example, the ticket issue number, event name, date and time, and seat number. The ticket data in this embodiment is sent in two-dimensional barcode data form.

When the ticket data is sent from the management center server 80, the ticket data is displayed in two-dimensional barcode form on a display 12 of the customer's portable communications terminal 10, which received the data. The customer presents the displayed two-dimensional barcode to a clerk at a gate 90 of the event site.

At the site gate 90, the presented two-dimensional barcode is read by a barcode reader (mark reader, code receiving means) 92 provided for an admission control terminal (process execution terminal, processing terminal) 91 ((4) in FIG. 19). The admission control terminal 91 receives the ticket data consisting of two-dimensional barcode and sends it to the management center server 80 ((5) in FIG. 19).

An admission control section (instruction information issuing section) 88 of the management center server 80 refers to the ticket DB 85 based on the ticket data sent from the admission control through the site gate communication section 89 (process executer communication section) to determine whether the ticket is valid or not. If it is determined that it is valid, the admission control section 88 sends a reply indicating that determination to the admission control terminal 91 of the site gate 90 ((6) in FIG. 19).

When the admission control terminal 91 receives the reply (instruction information, reply information) indicating that the ticket is valid from the management center server 80, it provides a visual or audio output indicating the determination and grants the customer holding the portable communications terminal 10 admittance to the site. Otherwise, it denies the customer admittance to the site.

The admission control section 88 of the management center server 80 flags the data on the valid ticket to indicate that it is "admitted" and stores it in the ticket DB 85.

In the ticket processing system described above, a customer may purchase a number of tickets in bulk at the ticket shop 82 and allot them to other people (hereinafter called "acquaintances"). In such a case, before acquaintances enter through the site gate 90 the customer allows the acquaintances to know: 1) the telephone number of his/her portable communications terminal 10 and his/her password, or 2) a ticket number indicated to the customer when the customer ordered the ticket at the ticket shop 82 and his/her password. When the acquaintances enters through the site gate 90, they access the management center server 80 from their own portable communication terminals 10. Then, they may gain admittance to the site by following the same procedure as described above with respect to the admission of customer him-/herself. Alternatively, the customer him-/herself may inform the management center server 80 of the telephone numbers of the portable communications terminals 10 of the acquaintances to whom the customer allots the tickets, prior to their entrance through the gate 90. The acquaintances may then access the management center server 80 from their own portable communications terminal 10, input their passwords, and gain admittance to the site by following the same procedure as described above with respect to the admission of the customer him-/herself.

In such a case, the customer's password is known to the acquaintances to whom the customer allots the ticket. Therefore, the customer may instead set passwords in the management center server 80 (preferably different from the customer's password, of course) of the acquaintances to whom the tickets are to be given. When the acquaintances access the management center server 80, they use the passwords.

In order to prevent the forgery of the ticket data in the two-dimensional barcode, it may be ensured that the management center server 80 does not send the ticket data to the customer's portable communication terminal 10 until immediately before (one hour before, for example) the site opens. The ticket data itself may be encrypted by using any of a variety of encryption technologies or an electronic watermark may be embedded in the ticket data to prevent illegal copying or tampering of the ticket data.

According to the embodiment as described above, a ticket processing system that does not need a real ticket can be provided because the customer can access the management center server 80 to obtain information about the ticket (ticket data), which the customer ordered from the ticket shop 82 and present it at the site gate 90 to use it as substitute for an admission ticket.

Because the two-dimensional barcode is used for payment information, the site gate 90 needs only to install a barcode reader 92 for two-dimensional barcode. In addition, it can be determined quickly and efficiently on the admission control terminal 91 or the management center server 80 whether visitors (the customer and/or his/her acquaintances) having tickets have entered the site or not, or the number of visitors.

While the ticket is ordered from the ticket shop 82 on the Web over the Internet 81 in the seventh embodiment, the ticket processing system can also be applied to a case where the customer orders a ticket at a real ticket shop.

While the two-dimensional barcode provided from the management center server 80 to the portable communications terminal 10 is presented at the site gate 90 in the seventh embodiment, the ticket data may instead be wirelessly transferred to the site gate 90 as in the first embodiment.

Furthermore, the above-described ticket processing system can also be applied to a ticket that is valid for a plurality of days or plurality of times, besides a one-day (one-time) ticket. In such a case, the ticket data may be provided from the management center server 80 each time the customer visits the site, as described with respect to the above-described embodiment. Alternatively, once the customer receives the ticket data from the management center server 80, the ticket data may be maintained valid and held in the portable communications terminal 10 during a predetermined period, and can be used a number of times. The ticket that is valid for a plurality of days or times is not limited to a ticket for an event such as a concert or sporting event. It may be a ticket for a bus, train, airplane, or other means of transportation, and the above-described ticket processing system can be applied to such a ticket.

In the first through seventh embodiments, the telephone number of the portable communications terminal 10 is used as information for identifying the customer, the present invention is not limited to such a configuration. It may be ensured that the telephone number is not revealed to the store 20 by encrypting it, or by using an ID code issued to the customer instead of the telephone number, for the purpose of security. However, if the telephone number is used, it can be automatically communicated to a called party when the portable communications terminal 10 is used. Instead of the ID code, the number of a credit card used by the customer may be used. However, it is not preferable in terms of security.

Payment information and ticket data presented by the customer at the store 20 or site gate 90 are provided from the management center server, 30, 50, 70, or 80 on each occasion. However, the payment information and/or ticket data may be contained in the portable communications terminal 10 if such configuration causes no problem of security, or if an adequate preventive measure against forgery is taken.

Other substitutions, omissions, or changes in the configurations described with respect to these embodiments may be made or other configurations may be used without departing from the spirit of the present invention.

In the preceding discussion, it will be understood that the various method steps discussed preferably are performed by one or more processors executing instructions of one or more program products stored in memory. It is understood that the various devices, modules, mechanisms, sections and systems described above may be realized in hardware, software, or a combination of hardware and software, and may be compartmentalized other than as shown. A typical combination of hardware and software could be a general-purpose computer system with a computer program that, when loaded and executed, controls the computer system such that it carries out the related methods described. Alternatively, a specific use computer, containing specialized hardware for carrying out one or more of the functional tasks of the invention could be utilized. Each component of the present invention can also be embedded in a computer program product, which comprises all the features enabling the implementation of the methods and functions described above, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

What is claimed is:

1. A processing system comprising:
   a data management server storing registration information about a customer, the registration information communicated through a network between the data management server and a financial account of the customer with an external financial institution;
   a customer communication terminal communicating data with said data management server and for outputting information for identifying a customer; and
   a process execution terminal receiving said information for identifying the customer from said customer communication terminal and executing a process for said customer, wherein:
   said process execution terminal provides said information to said data management server when receiving said information for identifying the customer;
   said data management server identifies the customer based on said information provided from said process execution terminal, generates reply information based on said registration information about said customer, the reply information indicating an approval of payment from the financial account, and provides said reply information to said process execution terminal; and
   said process execution terminal executes a process for said customer based on said reply information when receiving said reply information;
   wherein the information for identifying the customer and the registration information about the customer is associated with each other only at the data management server, the data management server being different than the process execution terminal that receives the information for identifying the customer.

2. The processing system according to claim 1, wherein:
   said data management server sends said information for identifying the customer to said customer communication terminal when said customer communication terminal accesses said data management server; and
   said customer communication terminal receives said information sent from said data management server and outputs said information to said process execution terminal.

3. The processing system according to claim 1, wherein said data management server inquires to an external credit institution about a credit card number for payment and provides information obtained from said external credit institution as said reply information if said registration information is the number of a card for payment.

4. The processing system according to claim 1, wherein said data management server communicates an amount billed included in said registration information as said reply information if said registration information is information about billing issued to said customer.

5. The processing system according to claim 1, wherein:
   said data management server determines whether an admission ticket is valid or not and provides the determination as said reply information, if said registration information is information about said admission ticket; and said process execution terminal outputs information indicating whether said customer is granted admittance or not based on said reply information from said data management server.

6. A processing system comprising:

a data management server associating an identification code identifying a customer with registration information registered for said customer, the registration information communicated through a network between the data management server and a financial account of the customer with an external financial institution, and sending mark data representing said identification code to a customer communication terminal; and a process execution terminal communicating data with said data management server, said process execution terminal having a mark reader for reading a mark displayed on the display of said customer communication terminal based on said mark data, and executing a process for said customer based on said read mark data, wherein:

said process execution terminal sends said mark data read by said mark reader to said data management server;

said data management server identifies said registration information associated with said identification code based on said mark data sent from said process execution terminal, generates instruction information indicating a process to be performed for said customer based on said registration information, and sends said instruction information to said process execution terminal; and said process execution terminal, which receives said instruction information, executes the process for the customer based on said instruction information;

wherein the identification code and the registration information is associated with each other only at the data management server.

7. The processing system according to claim 6, wherein said mark is a two-dimensional barcode.

8. The processing system according to claim 6, wherein said mark data sent to said customer communication terminal from said data management server is invalidated after the completion of the process in said process execution terminal.

9. The processing system according to claim 6, wherein said data management server sets information different from a payment card number held by said customer or an account number of said customer as said identification code.

10. The processing system according to claim 9, wherein said data management server sets a telephone number of said customer communication terminal as said identification code.

11. A server comprising:

data storage associating an identification code identifying a customer with registration information registered for said customer, the registration information communicated through a network between the data storage and a financial account of the customer with an external financial institution, and storing said identification code and said registration information;

a customer communication section communicating data with a customer communication terminal; and a code issuing section sending said identification code to said customer communication terminal through said customer communication section in response to a received request;

wherein the identification code and the registration information is associated with each other only at the data storage of the server.

12. The server according to claim 11, wherein said code issuing section sends said identification code in barcode data form.

13. The server according to claim 11, wherein:

said data storage associates a password set by said customer with said identification code and stores said password and said identification code; and said code issuing section verifies whether a password, input from said customer communication terminal, matches said password stored in said data storage, and issues said identification code.

14. The server according to claim 11, further comprising:

a process executer communication section communicating data with a process execution terminal for execution of a process requested by said customer; and an instruction information issuing section generating instruction information indicating the process to be performed by said process execution terminal for said customer based on said registration information associated with said identification code when receiving said identification code issued by said code issuing section through said process executer communication section from said process execution terminal, and providing said instruction information to said process execution terminal through said process executer communication section.

15. The server according to claim 14, wherein:

said data storage stores as said registration information a number of membership points held by said customer;

said instruction information issuing section informs a process execution terminal of the number of membership points as said instruction information when receiving said identification code and stores a new number of membership points in said data storage when receiving a new number of membership points changed from said number of membership points from said process execution terminal.

16. The server according to claim 15, further comprising a process confirmation section for confirming whether a process requested by said process execution terminal should be performed or not with said customer communication terminal before said instruction information issuing section provides said instruction information to said process execution terminal.

17. A processing terminal comprising:

a code receiver receiving an identification code, output from a communications terminal of a customer, for identifying said customer; and process information output logic inquiring of an external server about said identification code received by said code receiver, the identification code to be communicated through a network between the external server and a financial account of the customer with an external financial institution at the external server, and outputting process information for said customer based on a reply from said external server about said identification code, the reply information indicating an approval of payment from the financial account;

wherein the identification code is associated with registration information about the customer only at the external server.

18. The processing terminal according to claim 17, wherein said code receiver receives said identification code data from said customer communications terminal by a wireless communication.

19. The processing terminal according to claim 17, wherein said code receiver comprises a barcode reader for reading a two-dimensional barcode displayed on the display of said customer communications terminal.

20. The processing terminal according to claim 17, wherein said process information output logic displays an amount claimed from said customer based on a reply provided by said external server about said identification code.

21. A communication terminal comprising:
a display displaying an image;
a communicator accessing an external server;
a code issue requester accessing an external server through said communicator and requesting said external server to issue a process code; and
a display controller causing said display to display said process code in two-dimensional barcode form, wherein said process code is issued from said external server and received through said communicator;
wherein the external server issues the process code by associating information for identifying a customer using the communication terminal with registration information about the customer, the registration information communicated through a network between the external server and a financial account of the customer with an external financial institution, and wherein the information for identifying the customer and the registration information is associated with each other only at the external server.

22. The communications terminal according to claim 21, wherein said two-dimensional barcode displayed on said display is associated with information on billing issued to a customer holding said communications terminal.

23. The communications terminal according to claim 21, wherein said two-dimensional barcode displayed on said display includes data for an admission ticket.

24. A processing method performed when requested by a customer who registers registration information in a data management server to perform a predetermined process, the method comprising the steps of:
transferring an identification code generated by said data management server for said customer to a terminal held by said customer;
communicating said identification code from said terminal held by said customer to a process execution terminal;
sending an inquiry about said identification code from said process execution terminal to said data management server, the identification code to be communicated through a network between said data management server and a financial account of the customer with an external financial institution at the data management server;
generating instruction information for indicating a process to be performed for said customer based on said registration information associated in said data management server with said identification code and communicating said instruction information to said process execution terminal, the instruction information indicating an approval of payment from the financial account; and
executing a process in said process execution terminal based on said communicated instruction information;
wherein the identification code and the registration information is associated with each other only at the data management server, the data management server being different than the process execution terminal that receives the identification code.

25. A data management method comprising the steps of:
receiving and storing registration information about a customer in a data management server, the registration information communicated through a network between the data management server and a financial account of the customer with an external financial institution;
issuing an identification code identifying said customer, associating said identification code with said registration information only at the data management server, and sending said issued identification code to said customer when requested by said customer; and
identifying said registration information associated with said identification code, generating reply information based on said registration information, the reply information indicating an approval of payment from the financial account, and sending said reply information to a process execution terminal when said identification code is provided by said process execution terminal, the process execution terminal being different than the data management server.

26. A program product stored on a computer readable medium and executable on a computer for causing the computer to perform the steps of:
receiving registration information about a customer and storing said registration information in a data management server, the registration information communicated through a network between the data management server and a financial account of the customer with an external financial institution;
in response to a request received from said customer, issuing an identification code identifying said customer and associating said identification code with said registration information;
sending said issued identification code to said customer;
identifying said registration information associated with said identification code only at the computer and generating reply information based on said registration information, the reply information indicating an approval of payment from the financial account, when said identification code is communicated from a process execution terminal, the process execution terminal being different than the computer; and
sending said reply information to said process execution terminal.

* * * * *